(12) United States Patent
Beason

(10) Patent No.: US 9,447,646 B1
(45) Date of Patent: Sep. 20, 2016

(54) COMBINATION UNIT FOR MANAGING FLUID

(71) Applicant: Mud Maxx, LLC, Ardmore, OK (US)

(72) Inventor: Norman Bradley Beason, Madill, OK (US)

(73) Assignee: MUD MAXX, LLC, Ardmore, OK (US)

( * ) Notice: Subject to any disclaimer, the term of this patent is extended or adjusted under 35 U.S.C. 154(b) by 365 days.

(21) Appl. No.: 14/101,332

(22) Filed: Dec. 9, 2013

Related U.S. Application Data

(60) Provisional application No. 61/734,805, filed on Dec. 7, 2012.

(51) Int. Cl.
| | |
|---|---|
| E21B 43/26 | (2006.01) |
| E21B 21/06 | (2006.01) |
| C02F 1/68 | (2006.01) |
| C09K 8/68 | (2006.01) |
| C09K 8/62 | (2006.01) |
| C09K 8/64 | (2006.01) |

(52) U.S. Cl.
CPC ............... *E21B 21/062* (2013.01); *C02F 1/68* (2013.01); *E21B 21/065* (2013.01); *B01D 2221/04* (2013.01); *C02F 2201/008* (2013.01); *C02F 2305/00* (2013.01); *C09K 8/62* (2013.01); *C09K 8/64* (2013.01); *C09K 8/68* (2013.01); *E21B 43/26* (2013.01)

(58) Field of Classification Search
CPC ............ C09K 8/62; C09K 8/64; C09K 8/68; C09K 8/685; C09K 8/82; C09K 8/887; C09K 8/90; E21B 21/062; E21B 43/26; C02F 1/68; C02F 2305/00; C02F 2201/008
See application file for complete search history.

(56) References Cited

U.S. PATENT DOCUMENTS

| | | | | |
|---|---|---|---|---|
| 4,878,576 A | * | 11/1989 | Dietzen ................. | B65G 15/62 175/207 |
| 5,102,503 A | * | 4/1992 | Silinski ................... | C02F 1/048 159/DIG. 32 |
| 6,315,894 B1 | * | 11/2001 | Wiemers .................. | C02F 9/00 175/206 |
| 6,390,006 B1 | * | 5/2002 | Sridhar ................... | B63B 27/22 114/73 |
| 6,391,195 B1 | | 5/2002 | Layton | |

(Continued)

FOREIGN PATENT DOCUMENTS

| | | |
|---|---|---|
| CA | 2200524 | 9/1998 |
| CN | 202881019 | 4/2013 |

(Continued)

OTHER PUBLICATIONS

Venturi Mixing hopper, Advertisement, unknown.

(Continued)

*Primary Examiner* — Krishnan S Menon
*Assistant Examiner* — Waqaas Ali
(74) *Attorney, Agent, or Firm* — Harvey Law, P.C.; Derrick W. Harvey

(57) ABSTRACT

A combination unit for vacuuming, cleaning and conditioning fluids. The unit may comprise a vacuum pump circuit and tank, a mixing tank and a centrifuge system. The invention also includes a combination tank comprising a vacuum tank partially incorporated into a mixing tank. A mixing tank may comprise a system of mixing conduits and mixing apparatuses to shear drilling fluids and additives, the mixing tank including a rounded base and a drain to cycle the fluid back through to the mixing tank.

4 Claims, 24 Drawing Sheets

(56) References Cited

U.S. PATENT DOCUMENTS

| | | | |
|---|---|---|---|
| 7,022,240 B2 | 4/2006 | Hart | |
| 7,296,640 B2 | 11/2007 | Tettleton | |
| 7,300,578 B2 | 11/2007 | Mueller | |
| 7,387,727 B2 * | 6/2008 | Inoue | B01D 61/16 210/241 |
| 7,431,846 B2 * | 10/2008 | Palmer | B01D 21/0045 175/66 |
| 8,371,037 B2 | 2/2013 | Eia | |
| 8,528,665 B2 * | 9/2013 | Jackson | E21B 21/065 175/206 |
| 9,169,089 B2 * | 10/2015 | Rexius | B65G 37/00 |
| 2002/0162807 A1 * | 11/2002 | Kulbeth | B01D 21/0018 210/804 |
| 2005/0040119 A1 * | 2/2005 | Kulbeth | B01D 21/0045 210/45 |
| 2005/0042064 A1 * | 2/2005 | Kulbeth | B65G 33/10 414/319 |
| 2008/0236896 A1 * | 10/2008 | Ivan | B01F 3/088 175/217 |
| 2008/0283301 A1 | 11/2008 | Sherwood | |
| 2009/0178978 A1 * | 7/2009 | Beebe | E21B 21/065 494/43 |
| 2010/0193249 A1 | 8/2010 | Saiz | |
| 2013/0126448 A1 | 5/2013 | McCabe | |
| 2015/0060369 A1 * | 3/2015 | Richie | C02F 1/5281 210/723 |

FOREIGN PATENT DOCUMENTS

| | | |
|---|---|---|
| FR | 2636669 | 3/1990 |
| JP | 07096295 | 4/2007 |
| RU | 81516 U1 | 3/2009 |
| RU | 104231 U1 | 5/2011 |
| WO | WO 2010037185 | 4/2010 |
| WO | WO 2012131146 | 10/2012 |

OTHER PUBLICATIONS

Tango 500 Mud Recycling Systems, Advertisement, unknown.
Drilling Fluid Mixing and Cleaning Systems, Advertisement, unknown.

* cited by examiner

COMBINATION UNIT FOR MANAGING FLUID

BACKGROUND OF THE INVENTION

This invention relates to technology for moving, storing, cleaning and conditioning fluids. This invention also relates to an oilfield unit having a combination centrifuge, vacuum pump, and conditioning functionalities. The invention may further relate to such a unit that is especially suited for providing such combined functionalities in a single, combination unit that may be provided at the site of a drilling or production unit.

Drilling and production support services for hydrocarbon energies have existed perhaps as long as energy exploration itself. Such support services are required to maintain the fluids that are used in drilling, production and maintenance of the equipment for each step of the process of producing hydrocarbons. Fluids are delivered, utilized, removed from drilling and production sites, and in some scenarios require maintenance such as conditioning, removing impurities, adding other materials for different various functions. Although stand-alone "frac" tanks are capable of being utilized for the purpose of storing the fluids on site, additional maintenance of the fluids must take place off-site.

Fluids used in drilling operations are often combined with other additives, such as mud, to create different fluid profiles depending upon the depth of drilling and other environmental properties found downhole. Drilling rig operators do not always know the profile of the fluid they will need and will order more additive supplies and support services than needed to ensure the continuity of drilling progress. In many cases, a single fluid profile is created off-site and delivered to a storage tank located at the drilling site. In such cases, when drilling rig operators need a different drilling fluid profile they must either use an inadequate drilling fluid or shut down the drilling operation and wait for a new delivery of drilling fluid to be created off-site. The concept of shutting down a drilling rig operation for non-safety issues is anathema to the industry, due to the costs of equipment and labor involved with such a production.

One of the primary functions of fluid maintenance is that of cleaning the fluid of impurities. For exemplary purposes, consider drilling fluid that is used to aid the drilling of boreholes in the earth. On a drilling rig, drilling fluids are drawn from a "mud pit," through a drill string, carrying with it crushed rock and other debris up the annular space between the drill string and the sides of the bore hole. The drilling fluid is then returns to a mud pit or a tank.

In addition to the crushed rock and debris, drilling fluid can capture other impurities that require removal before reuse. Broadly speaking, the impurities may range in particulate size from large pieces of cement, to smaller metal cuttings to ultrafine particulates. With regards to the medium-to-large particles, fluids are typically stored in mud pits or tanks so that the large particulates settle over a time period of days. This practice requires operators to carry larger inventory of fluids and fluid containers to be available to ensure that the drilling operation continues unabated.

To remove the smaller particulates from drilling fluid, a centrifuge may be utilized. A centrifuge is an item of solids-removal equipment that removes fine and ultrafine solids. Large particulates may damage the centrifuge and its pump, so some preliminary separation of such large particulate impurities is preferred to protect the centrifuge and pump.

A centrifuge may take the shape of a conical drum that rotates at selected rpm. An operator introduces "dirty" or used drilling fluid into one end of the centrifuge, and the solids exit at the other end. Centrifuges are useful for processing weighted drilling fluids and can remove fine solids. Centrifuges can also be used for water clarification or for processing oily cuttings.

Centrifuges units are typically located at an energy service facility off-site of the drilling or production site. Given the weight, bulk and expense of the traditional centrifuge unit, the drilling rig operator is reluctant to locate the unit onsite of a busy drilling/production site. This additional step adds further expense and delay, but assures the operator that the recycled drilling fluid will return at desired state of cleanliness. Even if a centrifuge unit were to be placed on site, the matter of moving, storing, and preconditioning fluid before it may enter the centrifuge must be accomplished in a piecemeal, inefficient fashion that results in downtime of a drilling operation.

With regards to managing fluids, an energy production site may present a separate yet related set of challenges for service providers. For example, an oil leak onto a body of water or onto a muddy terrain requires a number of resources. Further, such leaks often occur along pipelines, where access to tools like centrifuge service providers, settling tanks (frac or batteries), and/or skimming devices may be lacking due to the remote location.

In the scenario of an oil leak, effective removal of any leaked fluids from a natural environment is of primary concern. A secondary objective is to manage the removed fluids and any other impact elements—debris, dirt, particulates that have been removed from the site of a leak—in a way that allows efficient and effective separation of each constituent element.

Prior art approaches include using vacuum trucks to remove leaked fluids and affected elements, taking those to another site to separate and manage those fluids and elements off site. Because each task was confined to a separate truck or work site, the workflow for managing and maintaining fluids was limited to the capabilities of the truck, work site, or other piece of equipment. The entire work flow operates without synergy between those tasks, and for creating opportunities to solve challenges on the work site that require short-term solutions rather than those accomplished off-site, with additional equipment that must be scheduled and delivered, all of which bring delay and effectively greater costs.

The present invention solves these problems by providing a combination unit 10 for maintaining fluids that includes functions for vacuuming, storage, screening, conditioning, of the fluids rather than having different trucks, skids, or work sites for each function. Additionally, the present invention provides a combination unit 10 with a plurality of ports for ingress and egress of fluids, allowing a user a plurality of access points and flow patterns to vacuum sources of fluids, clean the fluid of contaminants and particles, introduce desired additives and create conditioned fluids, and hold conditioned fluids until ready for use or discharge into separate storage. The present invention further provides such a combination unit 10 to be capable of delivery to on-site for utility on a drilling rig, a production unit, a pipeline leak or other environments where fluids are desired to be acquired and managed. The present invention even further provides a balanced, multi-functional unit capable of negotiating unimproved, energy lease roads by providing a vacuum storage tank partially incorporated into a mixing tank.

SUMMARY OF THE INVENTION

The invention may comprise a mobile, combination unit for the intake, storage, cleaning, and conditioning of fluids used in energy drilling and production worksites, the unit having a front and back portion, and a first side and second side, the unit comprising:

a first suction port and a second suction port located on a first side and second side of the unit for intake or discharge of a fluid of interest, a first fluid port and a second fluid port located on a first side and a second side of the unit for intake or discharge of a fluid of interest, the first and second fluid port communicating with a discharge pump capable of creating line pressure at the first fluid port and the second fluid port, a vacuum circuit comprising a vacuum pump and vacuum conduit, and a vacuum tank comprising
- a volume capacity,
- an access hatch atop the vacuum tank,
- a vacuum port, the vacuum port communicating with the first and second suction port through pressure generated by the vacuum pump within the vacuum circuit,
- an air line positioned between the top of the vacuum tank and the vacuum pump,
- a float valve located between the air line and the vacuum tank and a float residing within and rising with the fluid inside the volume tank, wherein upon reaching the volume capacity of the volume tank the float engages the float valve and cuts off the air line pressure, a mixing tank having an exterior and an interior, a first side and a second side, a top portion, and a bottom portion, and at its interior bottom portion a rounded base, the mixing tank further comprising
- a first mixing conduit and a second mixing conduit disposed along the interior walls of the mixing tank, the first mixing conduit located on the first side and the second mixing conduit located on the second side, the first mixing conduit having a series of dispensers and a second mixing conduit having a series of dispensers disposed along the interior walls of the mixing tank, the first mixing conduit located above the rounded base of the first side and the second mixing conduit above the rounded base along the second side, the dispensers of the first mixing tank and second mixing tank propelling directed fluids down the sidewalls of the rounded base, staggered in position from the dispensers of the second mixing conduit, whereby the directed fluids leaving the dispensers of the first mixing conduit travel a first series of paths upwards an opposite end of the rounded base, the directed fluids propelled from the dispensers of the second mixing conduit and traveling a second series of paths upwards an opposite end of the rounded base, and whereby first series of paths are incongruous with the second series of paths along the rounded base of the mixing tank and whereby the fluid engagement elements of the mixing apparatuses may pick up the directed fluids as they travel upwards,
- a main return line partially disposed within the mixing tank, the main return line having apertures through which fluid may travel within the mixing tank, the main return having a screen, the screen also communicating with the vacuum line,
- a mixing apparatus disposed from the top and into the interior of the mixing tank, the mixing apparatus having an rotating axis supporting a fluid engagement element positioned diagonally and having a leading edge and a trailing edge, the leading edge of the fluid engagement element being lower than the trailing edge, a centrifuge system, comprising a centrifuge and a positive pressure pump capable of programming the rate of flow of the fluid to be processed by the centrifuge, a matrix system for moving the fluids through the unit, the matrix system comprising a closed loop system of between 3-7 barrels in volume that may be isolated within the matrix system by closing a roll line valve located upstream of the mixing conduits and pre hopper line, and by closing a main valve located on the main return between the fluid removal conduit and the screen.

a centrifugal pump disposed between the main return line and a roll line that communicates with the first mixing conduit and the second mixing conduit, a venturi hopper, a post-hopper conduit located between the hopper and mixing tank, the post hopper conduit traveling from the exterior to the interior at the first side of the mixing tank and carrying fluids embedded with drilling fluid additives, the post-hopper conduit further comprising an initial altitude, a second altitude higher than the initial altitude, and a spout from which pressurized fluids propel from the post-hopper conduit downwardly within the interior of the mixing tank a screen for capturing and removing large particulates of the fluids, a control panel electronically linked to and controlling the mixing apparatuses, the centrifugal pump, the positive pressure pump, the vacuum pump and the discharge pump Numerous objects and advantages of the invention will become apparent as the following detailed description of the preferred embodiments is read in conjunction with the drawings which illustrate such embodiments.

DETAILED DESCRIPTION OF THE PREFERRED EMBODIMENTS

Figure 1:
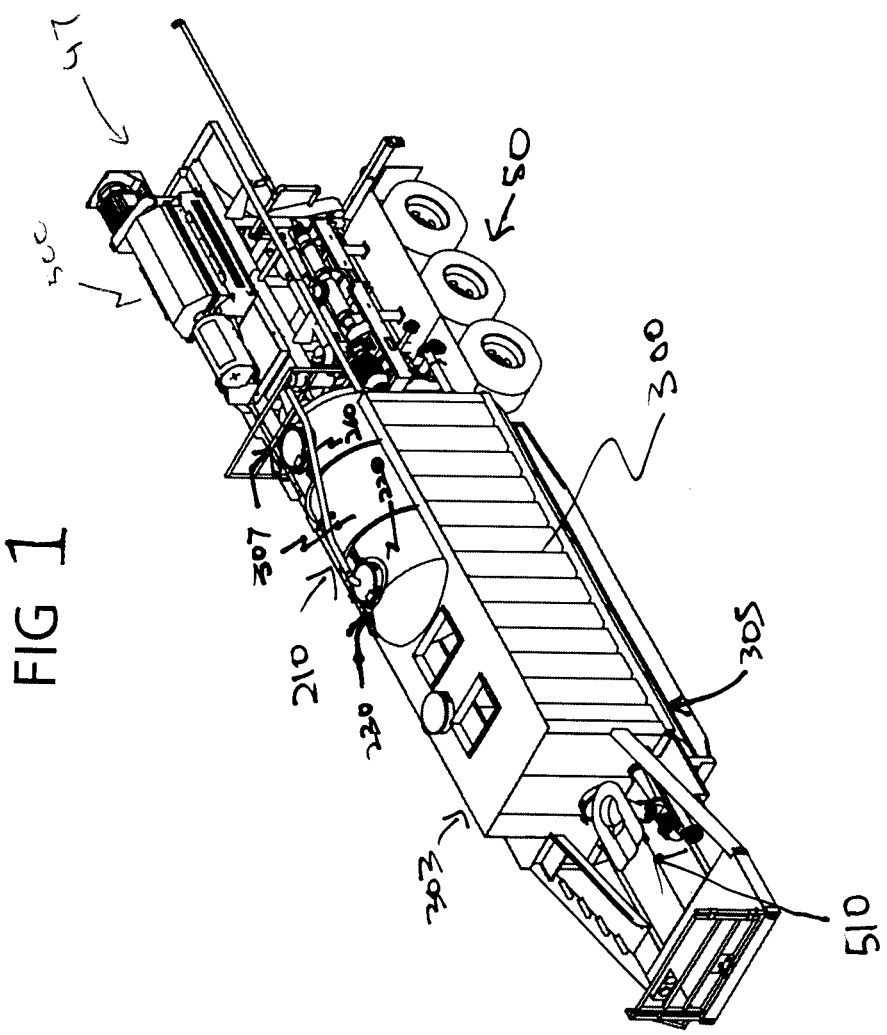
FIG. 1 depicts a flow diagram of the different operations of unit.
Figure 2:
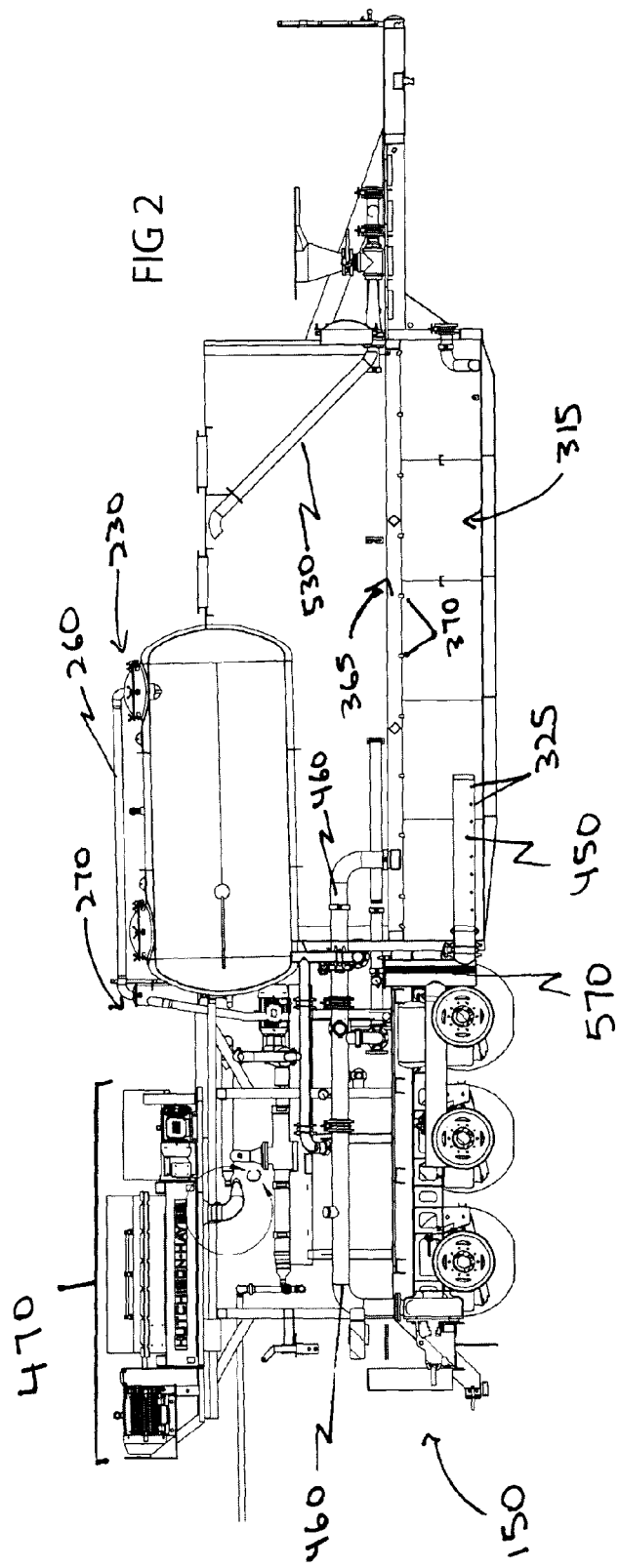
FIG. 2. is a side view of an embodiment of the combination unit.
Figure 3:
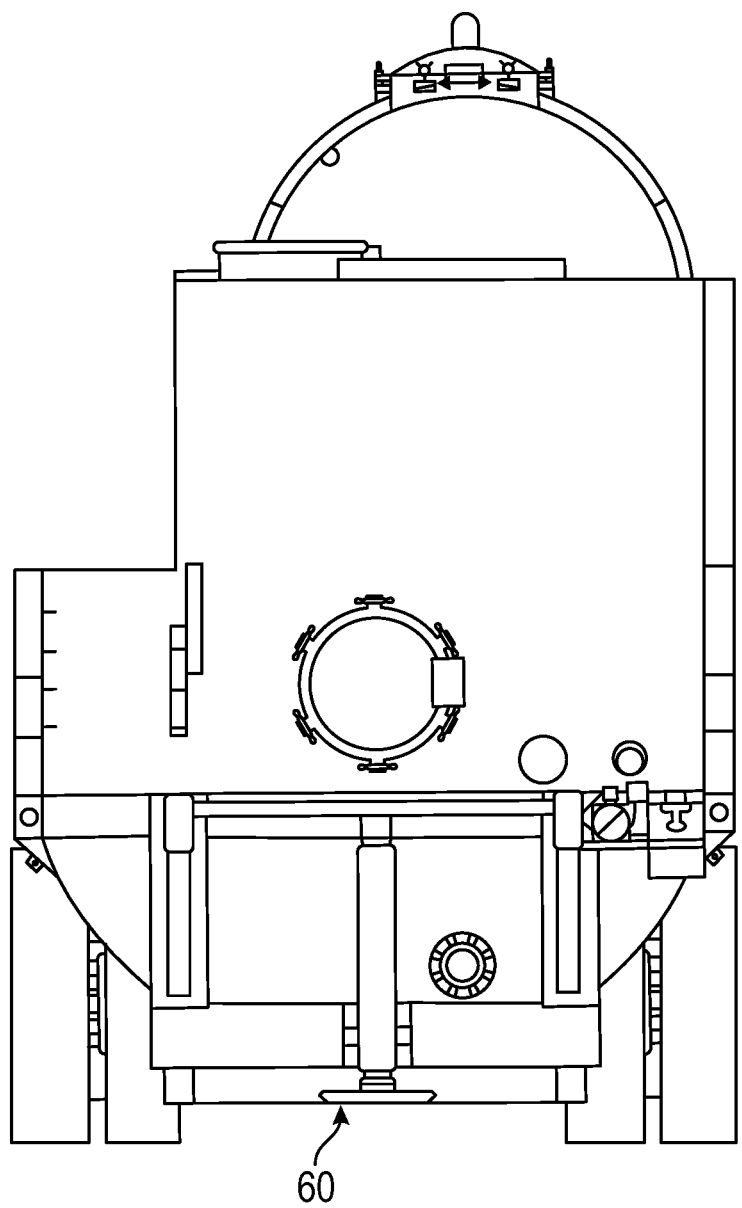
FIG. 3 is a rear view of an embodiment of the combination unit.
Figure 4:
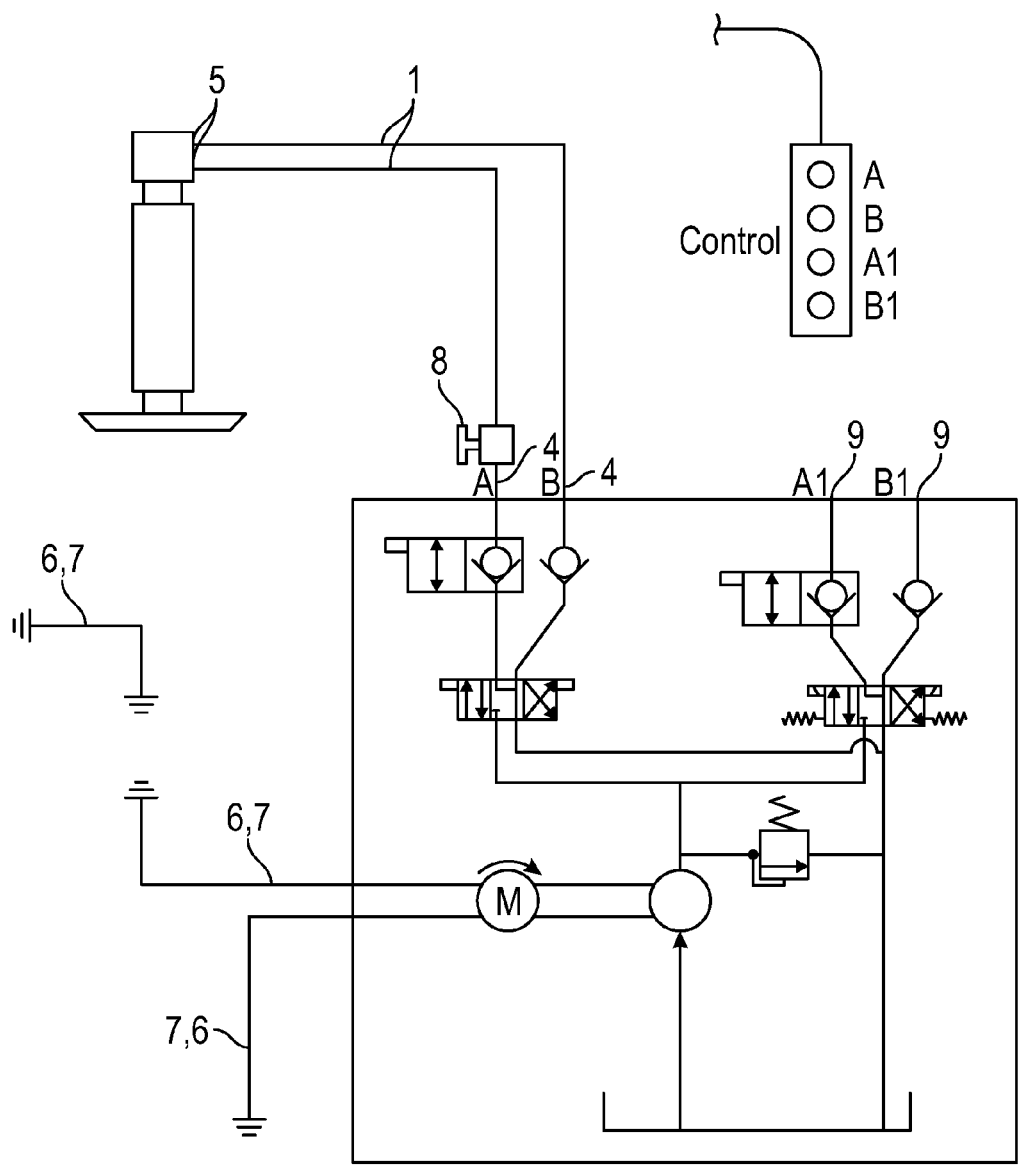
FIG. 4 is a schematic drawing of a hydraulic system of the combination unit.
Figure 5:
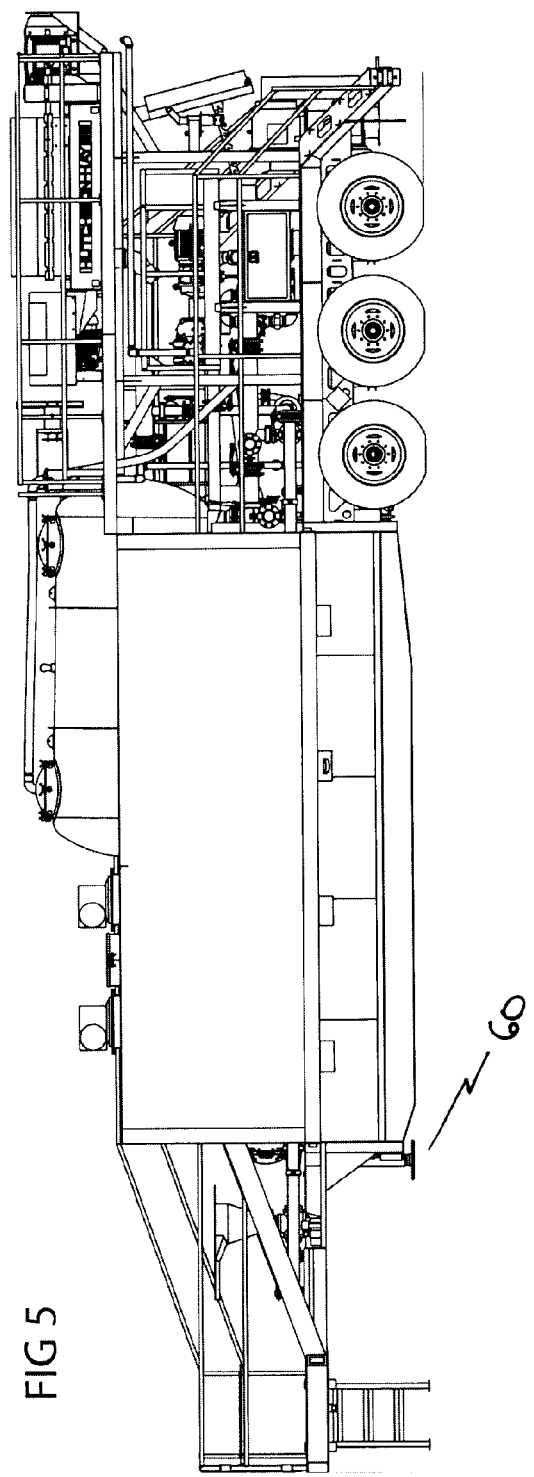
FIG. 5 is a side view of the combination unit.
Figure 6:
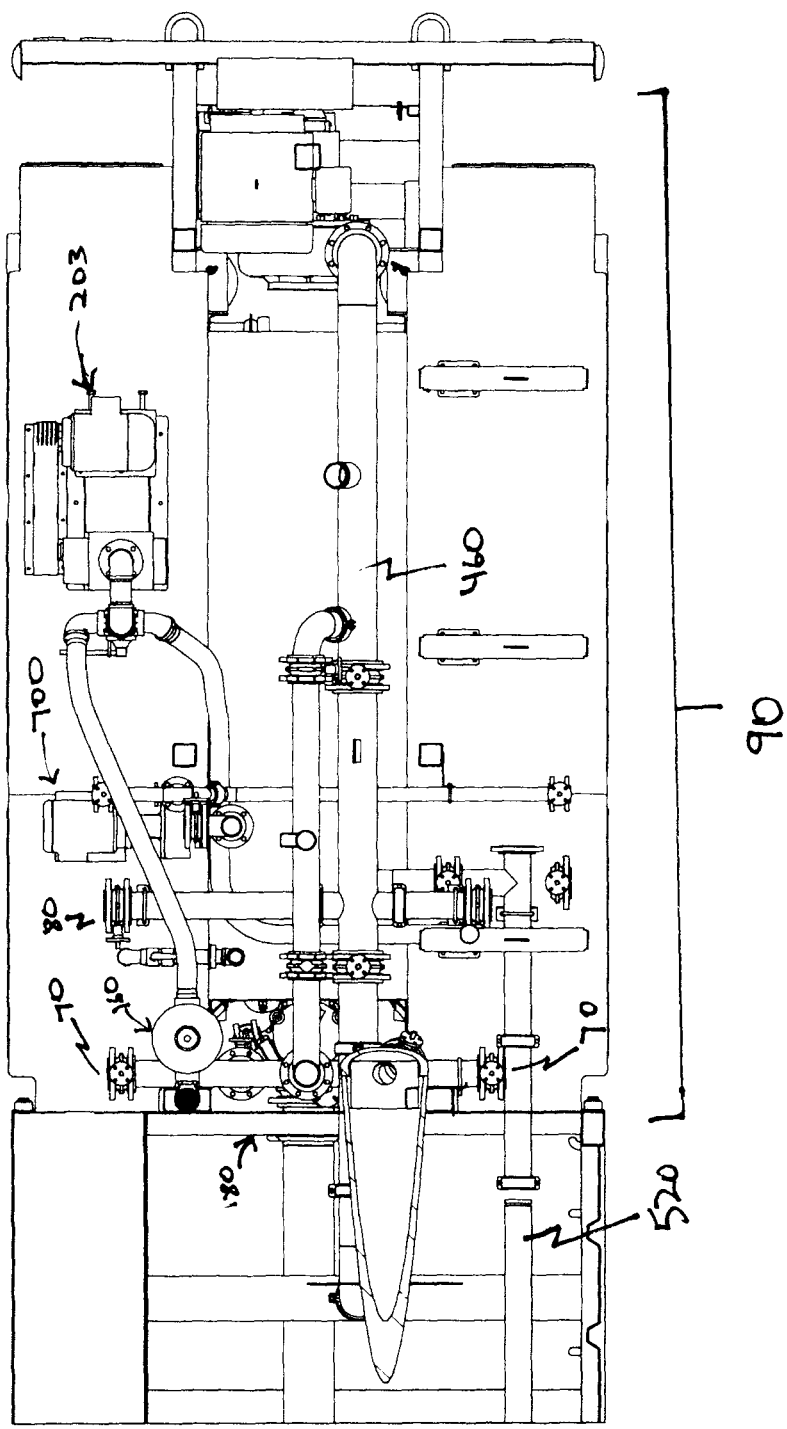
FIG. 6 is a top view of an embodiment of the combination unit, showing the vacuum circuit and other pumps located towards the back of the unit.
Figure 7:
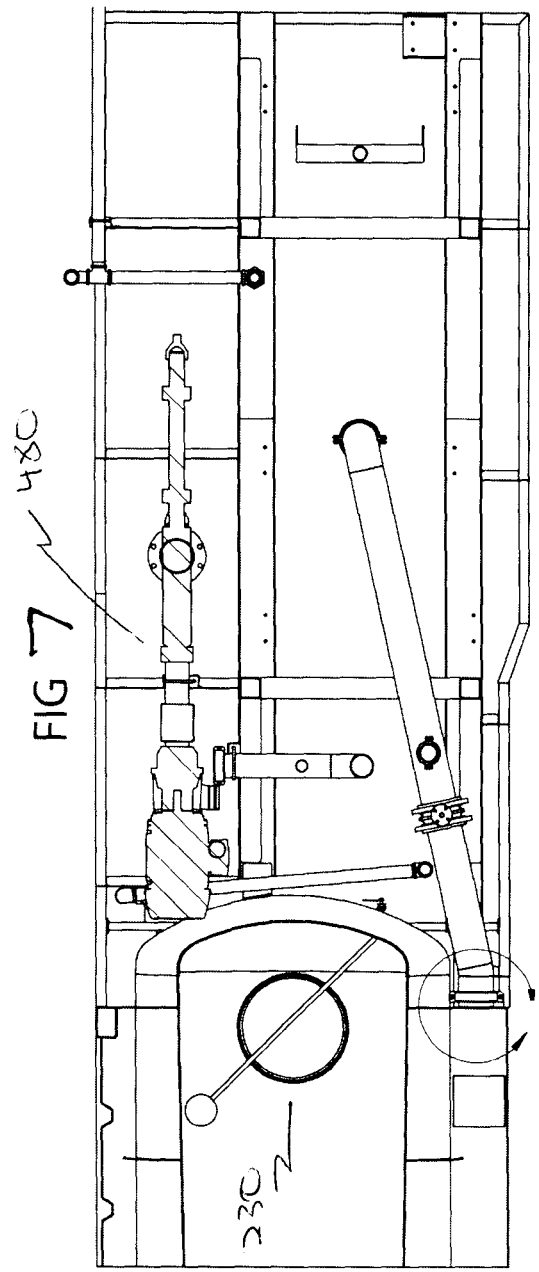
FIG. 7 is a top view of an embodiment of the combination unit towards the back of the unit.
Figure 8:
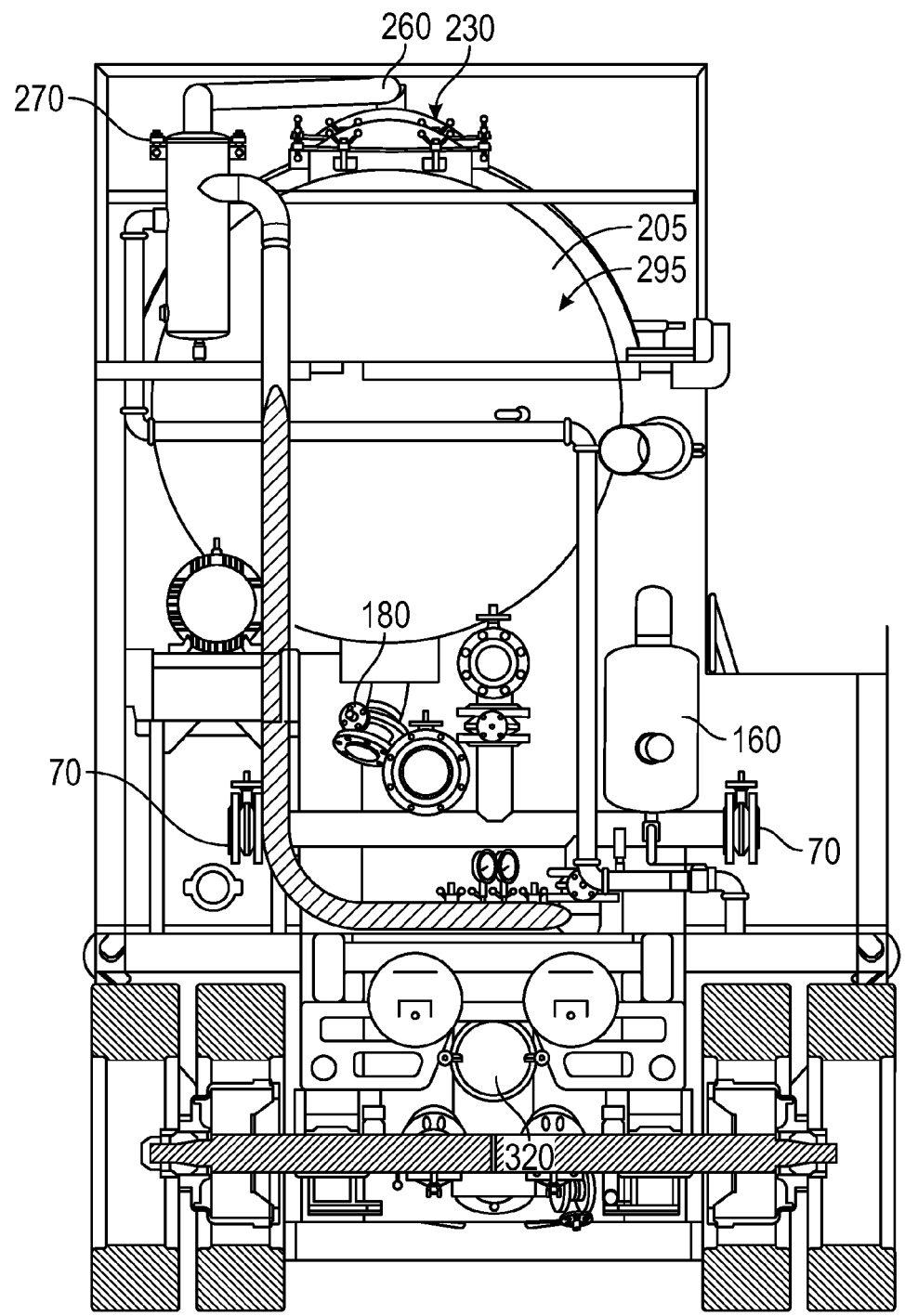
FIG. 8 is a view of the back end of an embodiment of the invention.
Figure 9:
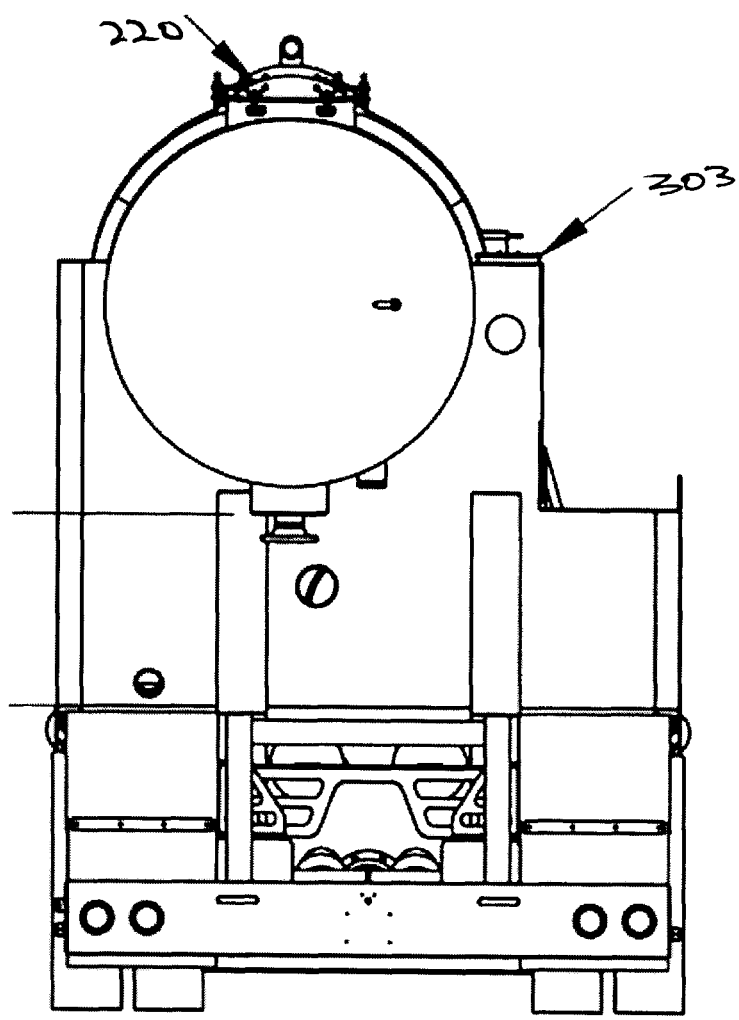
FIG. 9 is a view of the vacuum tank from the perspective of the back end, a cross-section of an embodiment of the invention.
Figure 10:
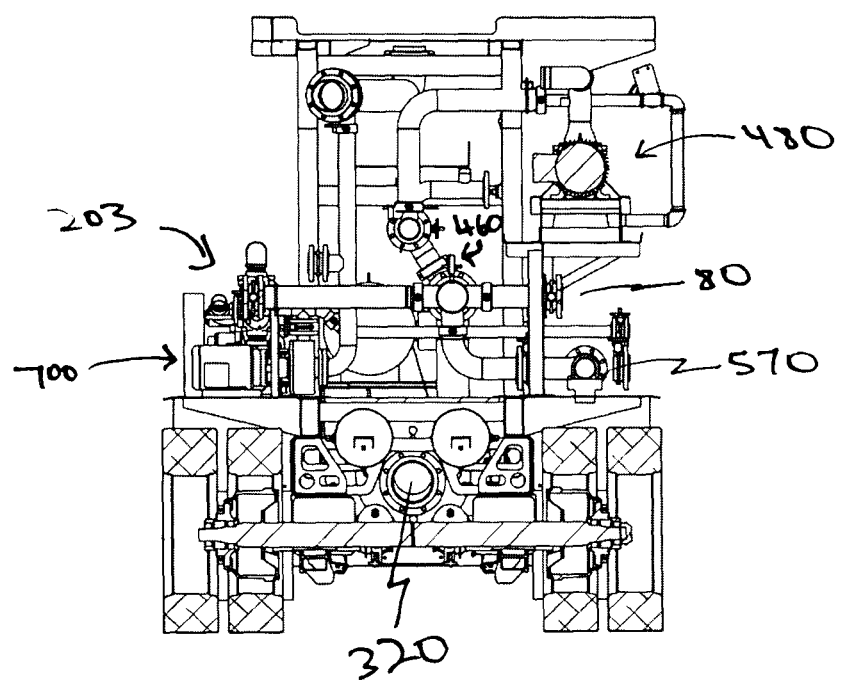
FIG. 10 is a view of the back end of an embodiment of the invention, showing portions of the vacuum circuit and matrix.
Figure 11:
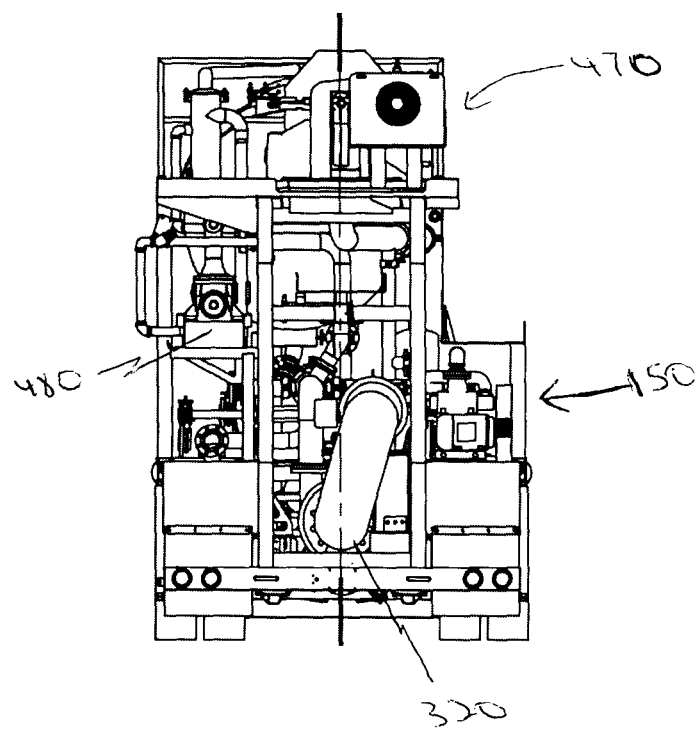
FIG. 11 is a view of the back end of an embodiment of the invention.
Figure 12:
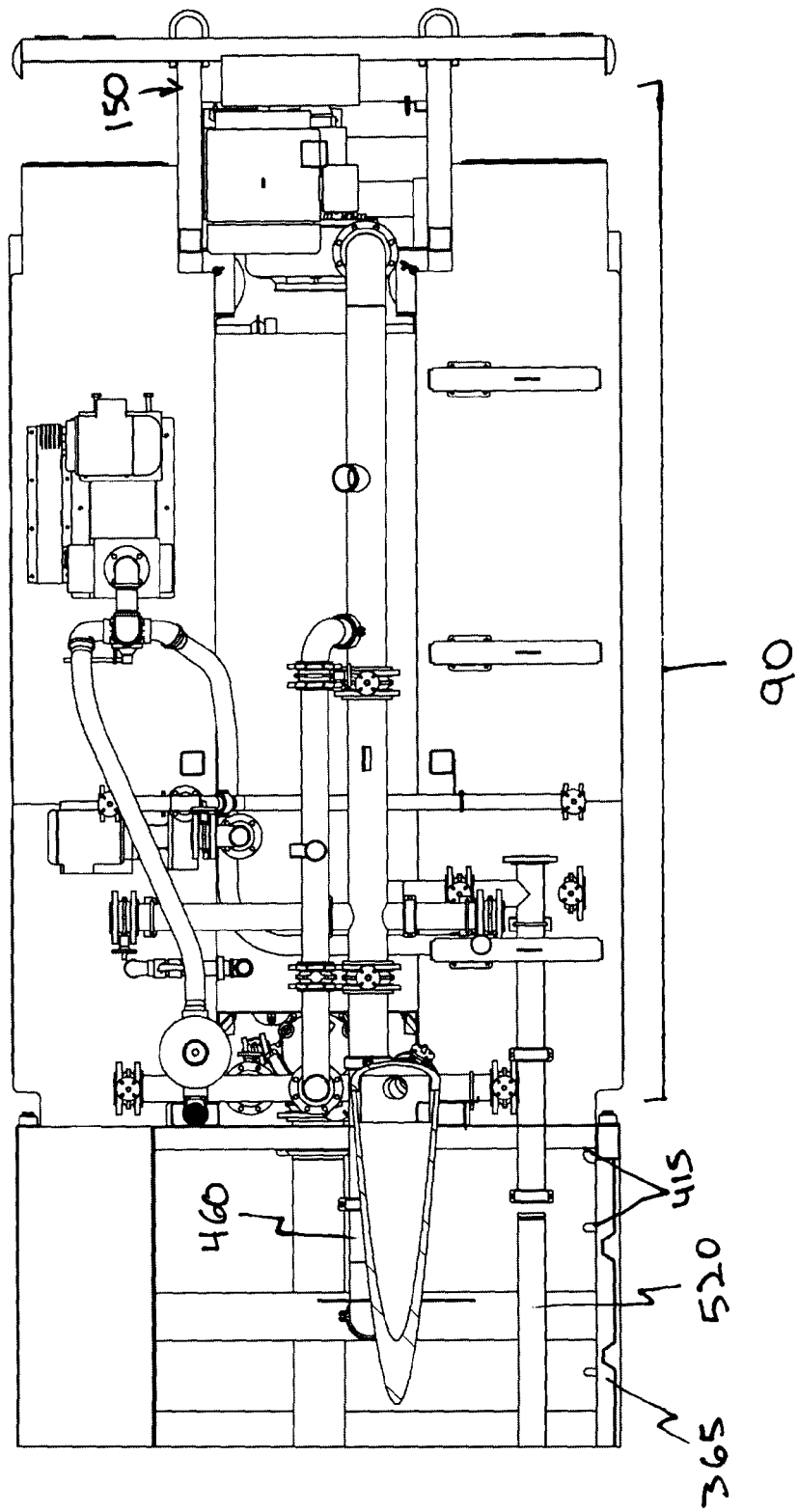
FIG. 12 is a top view of an embodiment of the invention showing the matrix system.
Figure 13:
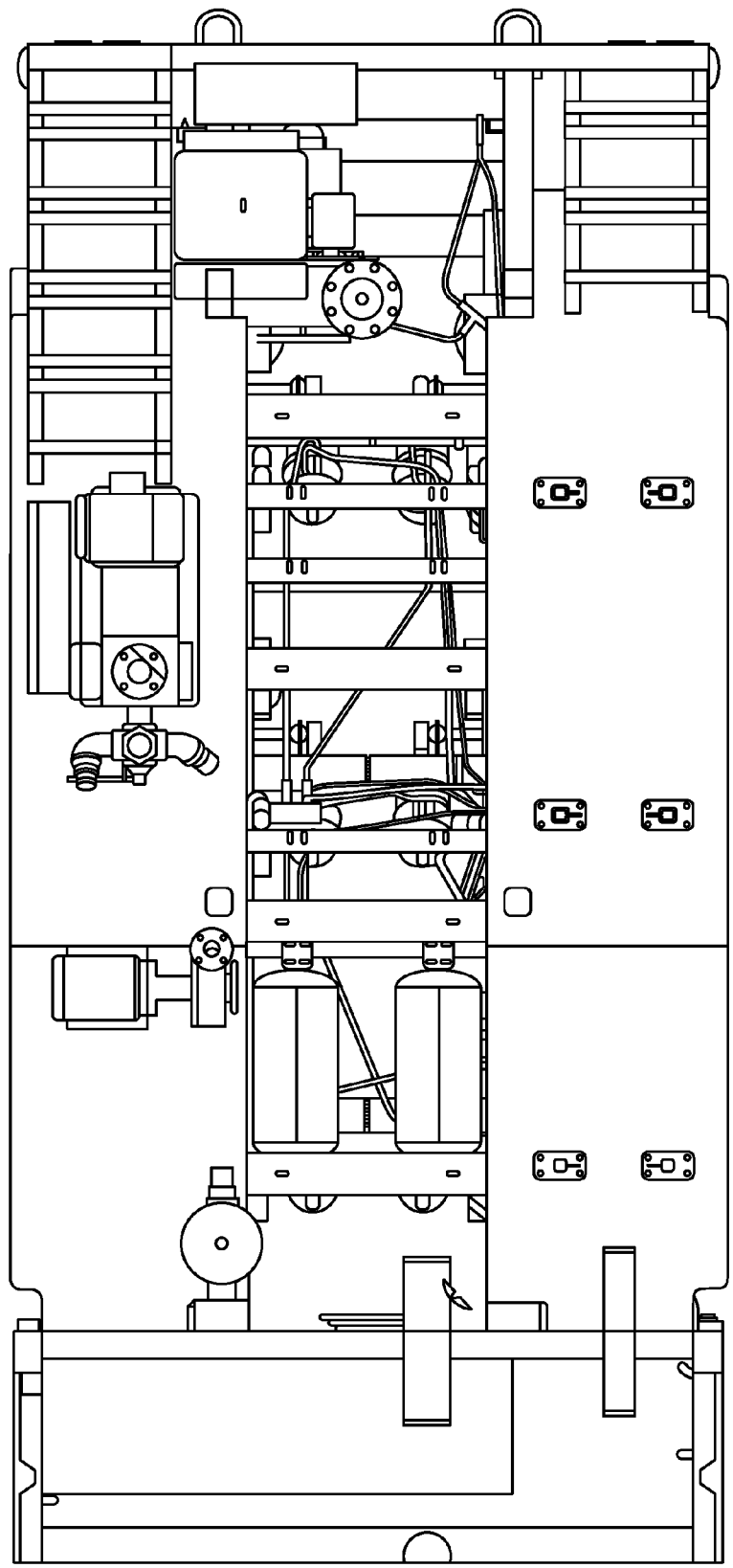
FIG. 13 is a top view of an embodiment of the invention showing electrical and pump positioning.
Figure 14:
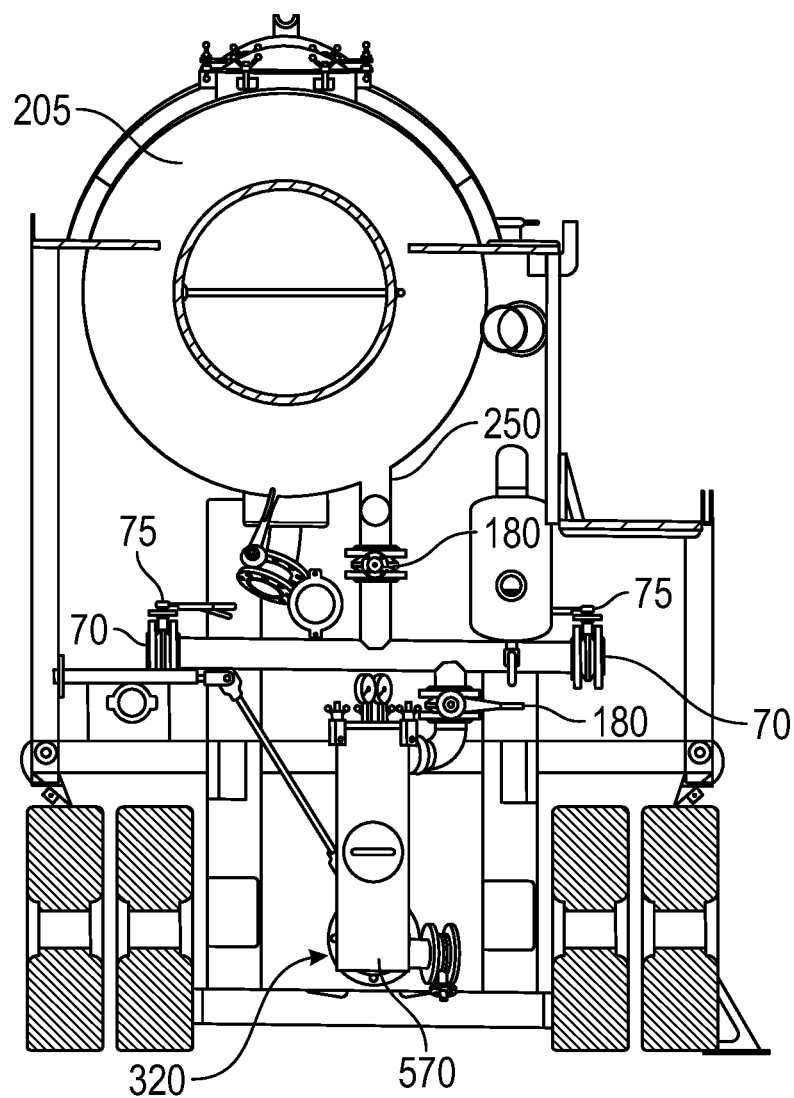
FIG. 14 is a rear view of an embodiment of the invention showing the screening mechanism and vacuum system.
Figure 15:
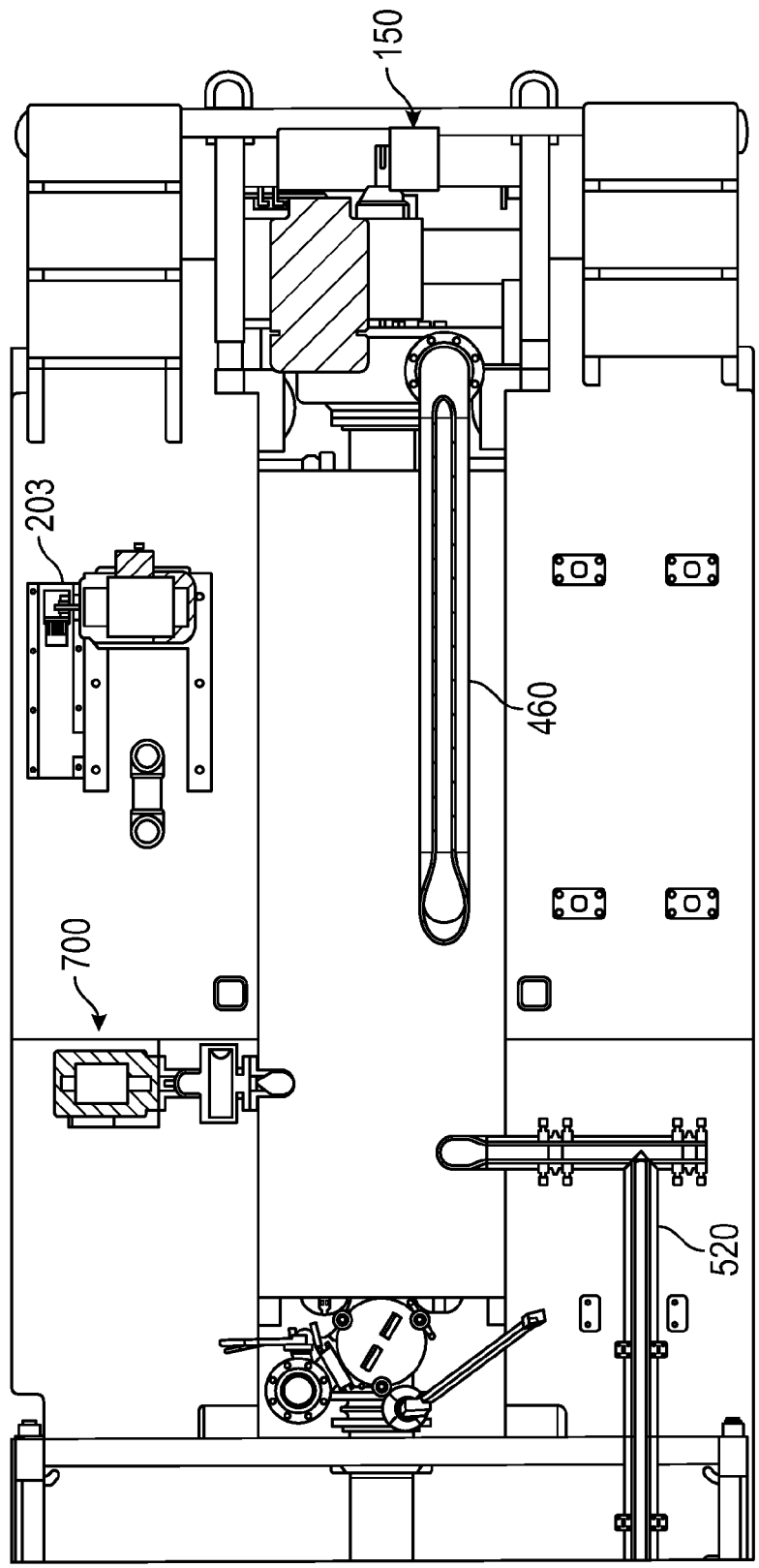
FIG. 15 is a top view of an embodiment of the combination unit showing pumps and conduit to the venture hopper.
Figure 16:
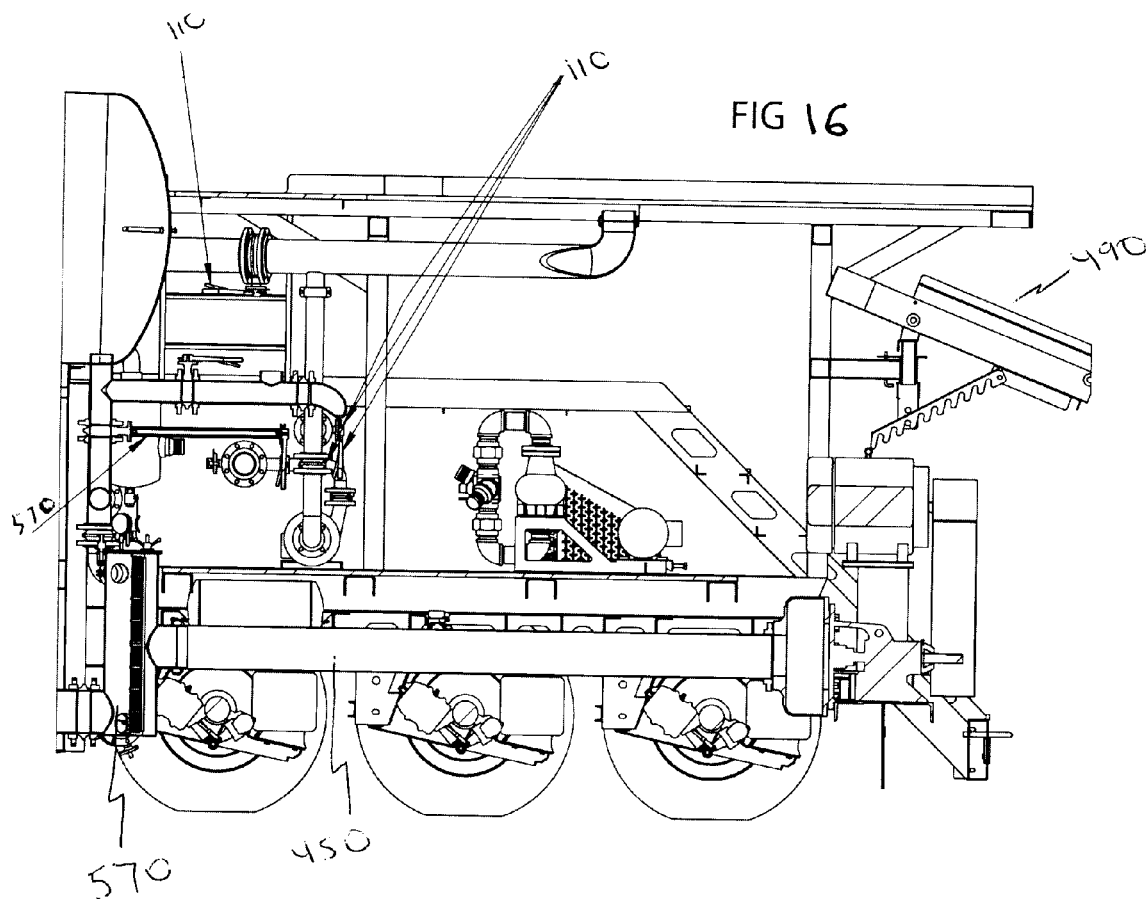
FIG. 16 is a side view of an embodiment of the combination unit, showing valves utilized in the matrix system.
Figure 17:
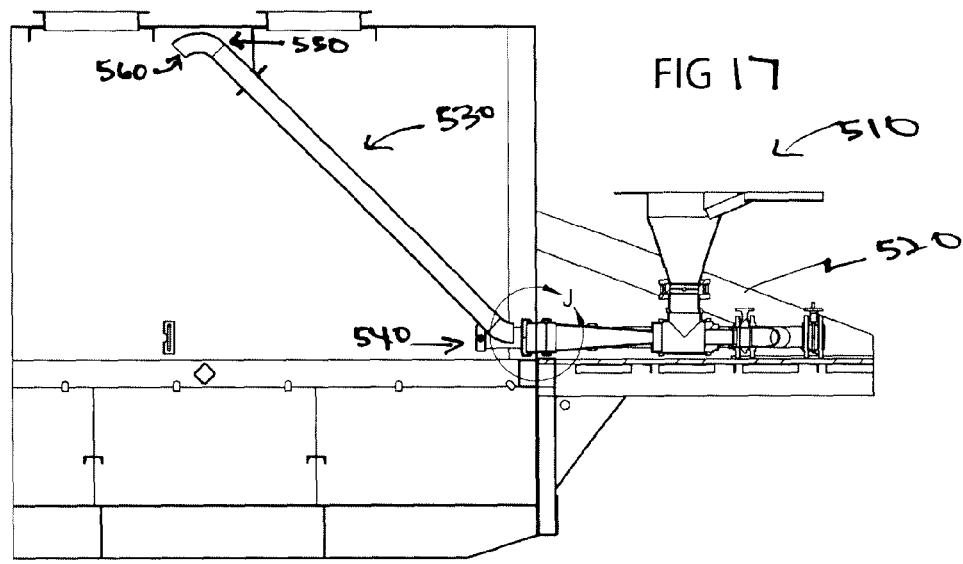
FIG. 17 is a side view of the venturi hopper system according to an embodiment of the invention.
Figure 18:
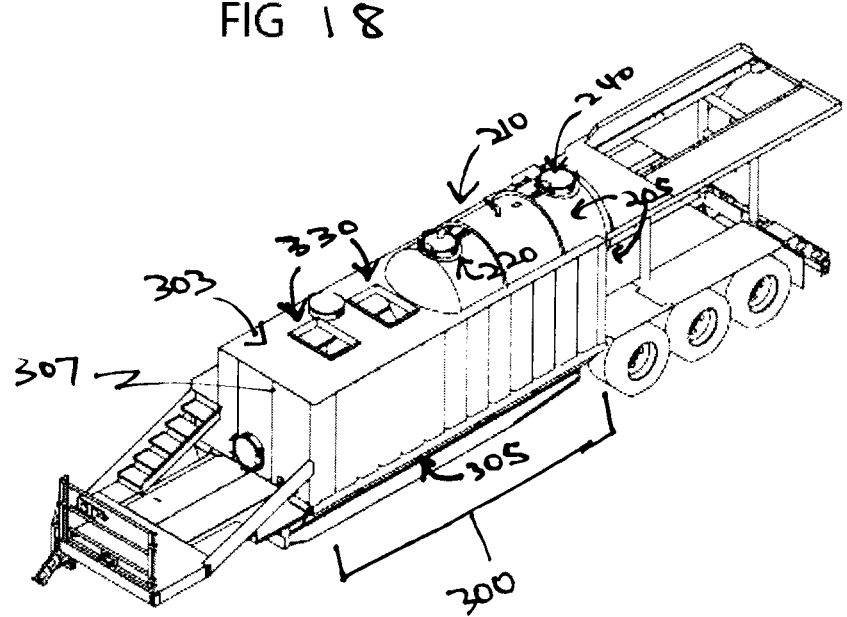
FIG. 18 is a top perspective view of an embodiment of the combination unit showing the mixing tank and vacuum tank.
Figure 19:
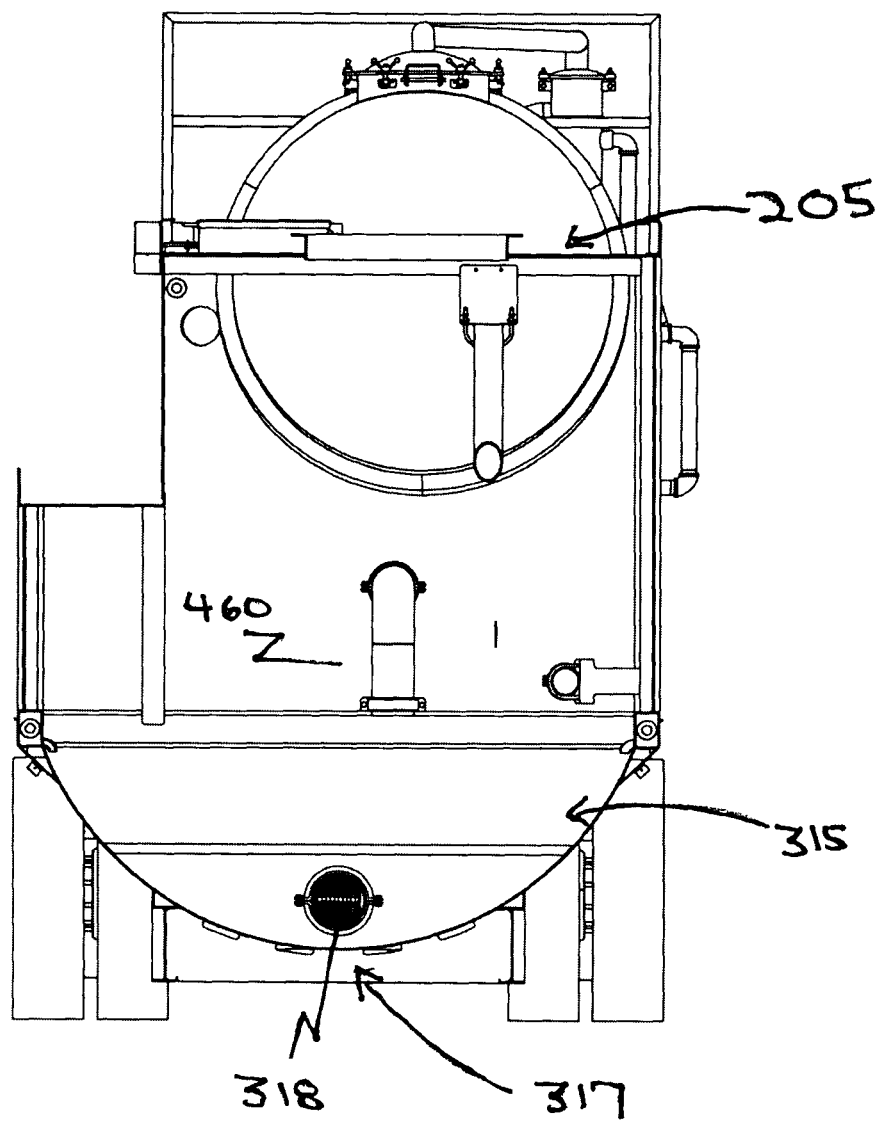
FIG. 19 is a rear view of the mixing tank and vacuum tank of a cross section according to an embodiment of the combination unit.
Figure 20:
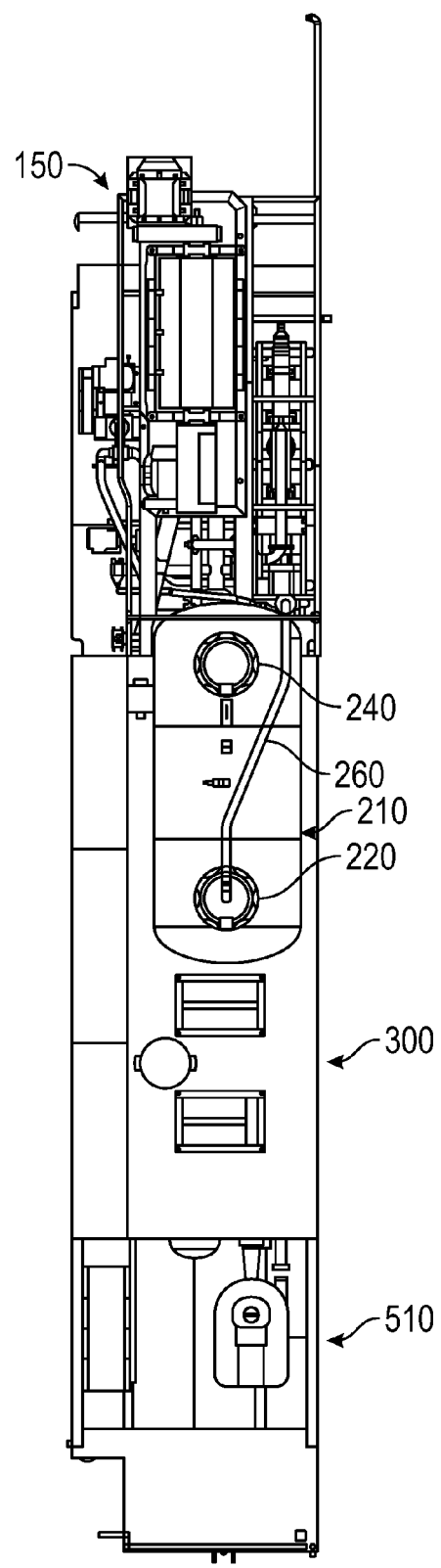
FIG. 20 is top view of an embodiment of the combination unit.
Figure 21:
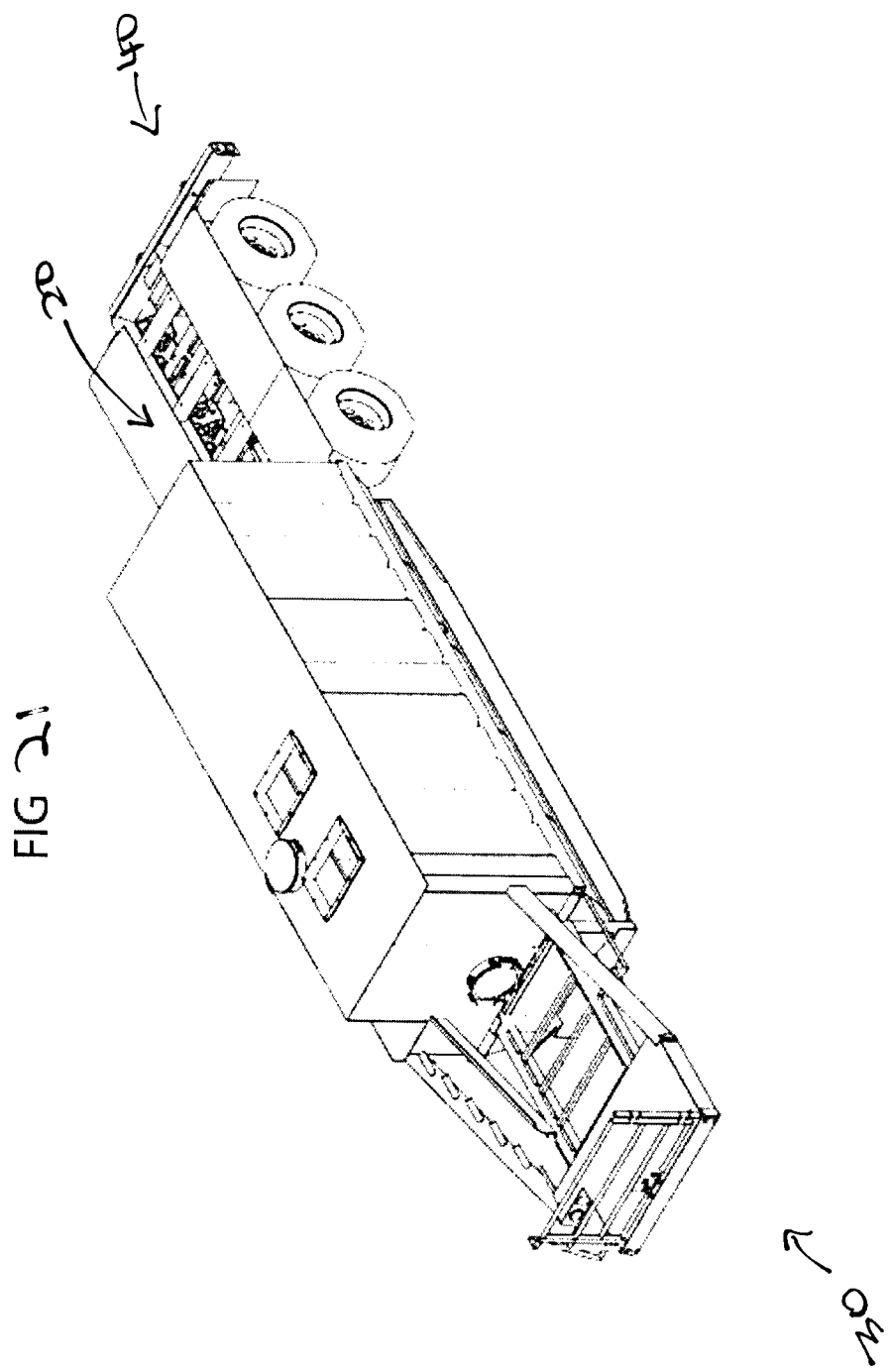
FIG. 21 a top perspective view of an embodiment of the combination unit.
Figure 22:
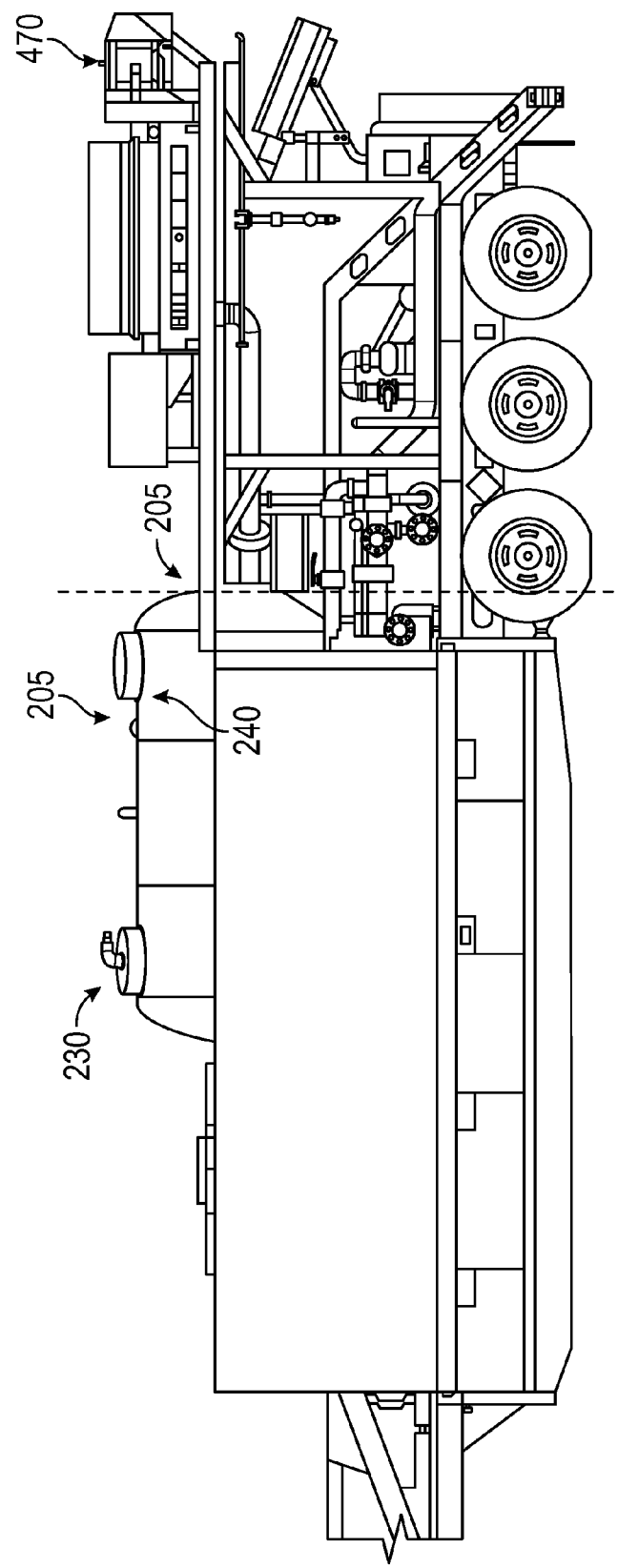
FIG. 22 is a side view of an embodiment of the rear portion of the combination unit.
Figure 23:
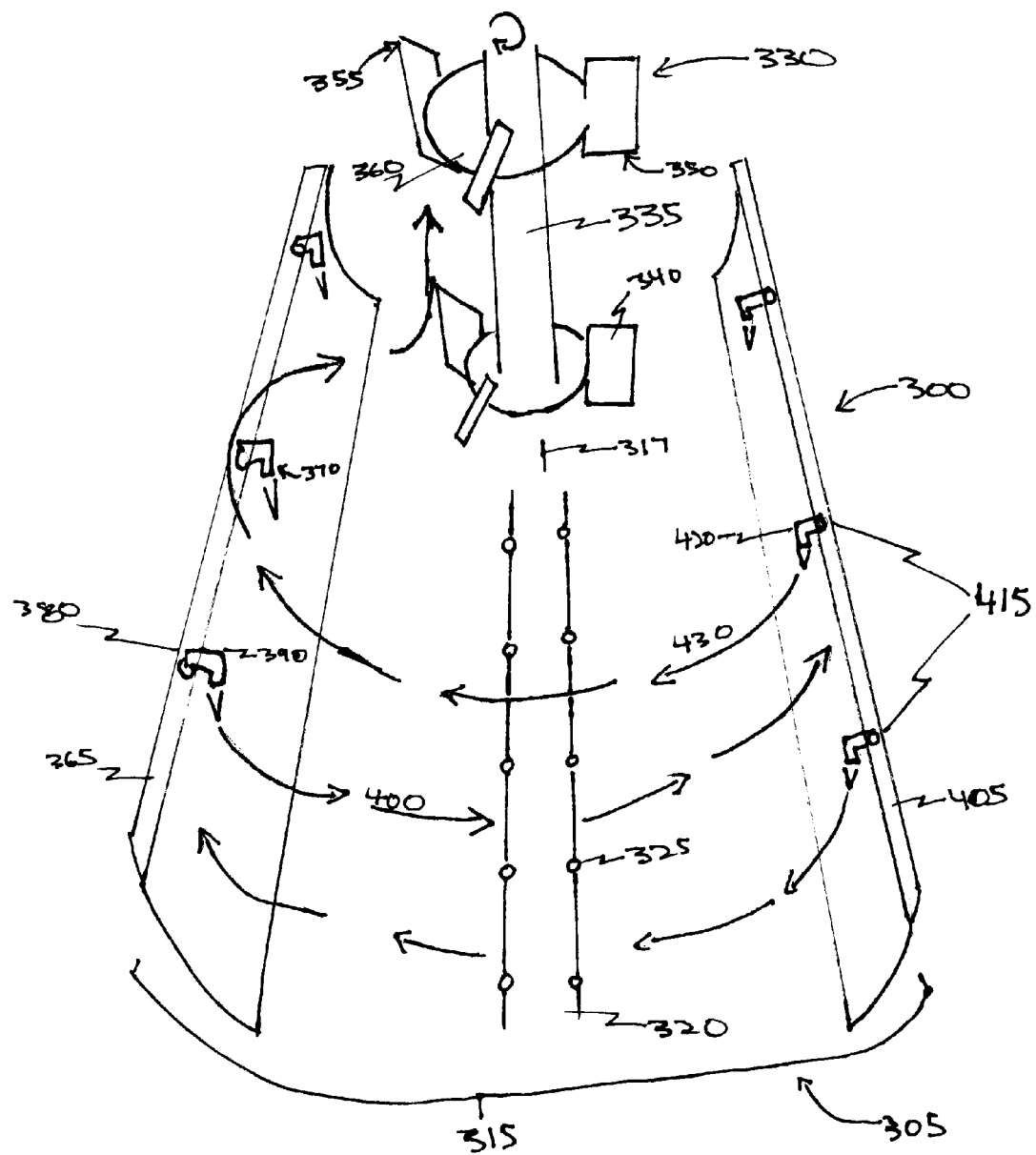
FIG. 23 is a top perspective view of an embodiment of the interior of the mixing tank of the combination unit.
Figure 24:
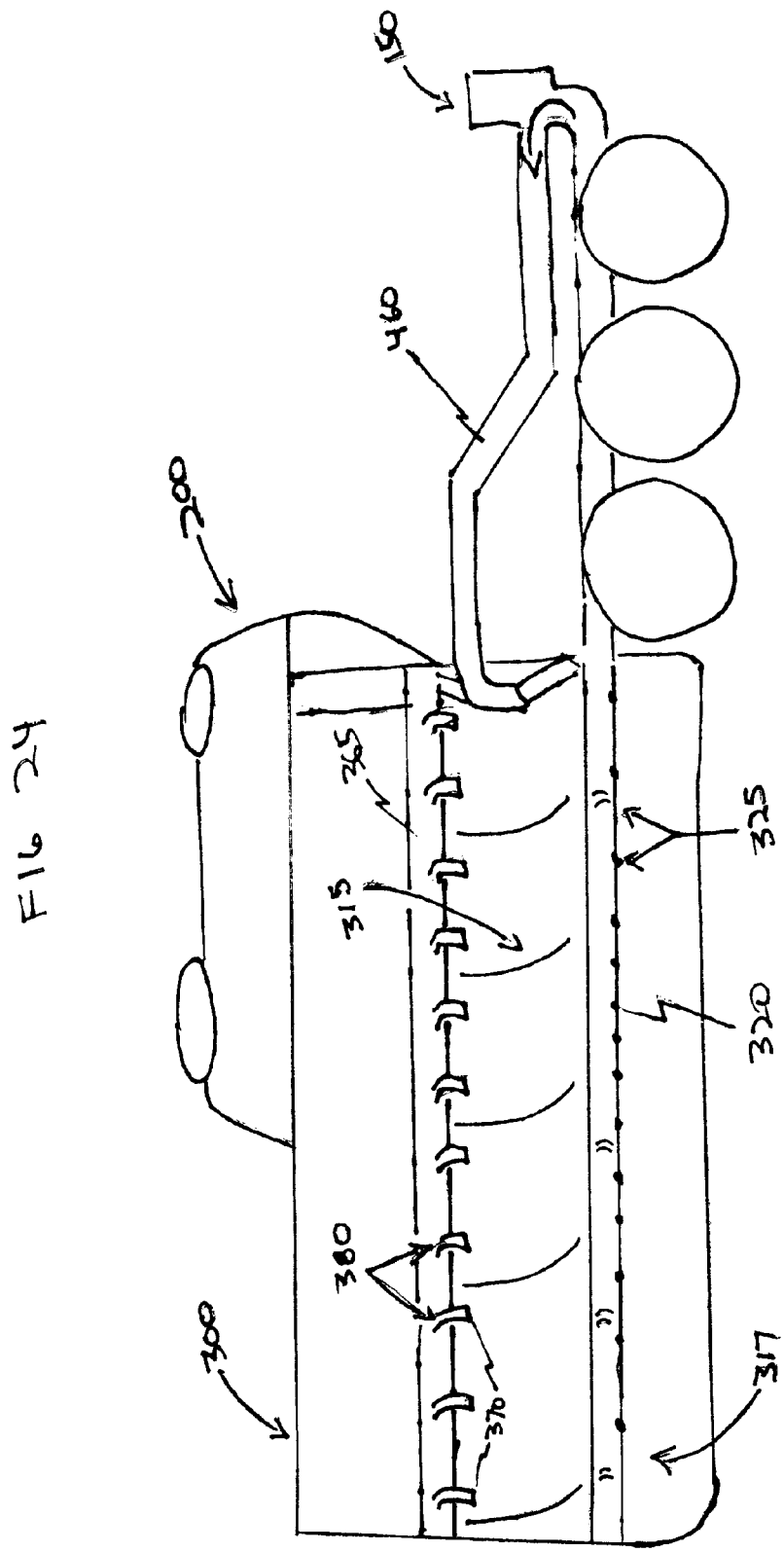
FIG. 24 is a side view of an embodiment of the interior of the mixing tank of the combination unit.

FIGS. depict preferred embodiments of the combination unit 10 for managing fluids. The unit may comprise a vacuum circuit 210, a mixing tank, a centrifuge system 470, at least one pump, and at least one access point for acquiring and discharging fluids. The unit may further comprise a matrix system 90 for conveying fluids through conduits 100, pumps, valves 100 and other connection components for conveying fluids. The tank may be constructed from a number of materials whose properties are suitable for safely handling fluids with a varying degree of hazardous nature. One mode of practice utilizes galvanized steel for surfaces coming into contact with fluids to be managed. Other materials may be employed known in the art to provide the same characteristics as described in this invention.

According to preferred embodiments of the invention, the combination unit 10 includes a frame that may function as a chassis 20 and axles to enable the unit as a whole to be transported to a site desired for usage. The chassis 20 may include a suspension capable of selectively lowering the unit, for example to the ground at a drilling or production site. The suspension means may comprise a system for lifting and lowering the chassis 20 through hydraulic mechanisms 60. The suspension means has a benefit of stabilizing the centrifuge system 470 with shock absorption properties during transit of the combination unit 10, lowering the risk of damage to the most expensive and delicate piece of equipment on the unit, the centrifuge. The combination unit 10 may have a front portion 30 where a transporting vehicle may engage the unit by a hitch or other engagement 35. At a back portion 40 of the unit are tires 50 appropriate for the size of each embodiment of the invention, shown in FIGS as having three sets of tires 50 on each side of the back portion 40 of the unit.

For the management of used fluid, the combination unit 10 may comprise separate structures constructed in a unitary whole and operating synergistically through which used fluid may travel for cleaning and customized conditioning into fluid ready for use at a drilling site. The unit may comprise a vacuum pump and tank, a large particulate screen, a centrifuge system 470, a venture hopper, and a mixing tank, the operation of which is automatically controlled by an electronic and digital control panel. Other supporting equipment for managing the flow of fluids between these structures, such as manifold combinations, butterfly or other valves 110, conduits 100 and attendant couplings.

The unit may capture external fluids by utilizing the vacuum circuit 200 comprising a vacuum pump 203, vacuum circuit 210, vacuum conduit through which the vacuum pump 203 builds pressure to move fluid, and valves to isolate or divert the fluid outside the vacuum circuit 200.

In the embodiment shown in FIGS, an approximately forty (40) barrel vacuum tank 210 may have a generally cylindrical shape comprises an enclosed portion 215 at least partly enclosed within the mixing tank and an exposed portion 205 visible outside of the mixing tank. The vacuum tank 210 and vacuum circuit 200 may be fully isolated from the mixing tank and is capable of storing a separate volume of fluid from the mixing tank. The vacuum tank 210 may include a range of volume from 10-1000 barrels according to other embodiments of the invention. In other embodiments of the invention, the vacuum tank 210 may be fully enclosed within the mixing tank or located outside the mixing tank altogether.

In FIGs looking at the exposed portion 205 of vacuum tank 210 facing the vacuum pump 203, a vacuum port 250 is shown into which fluid may be pumped from a source of fluid. Vacuum air line 260 emerges from atop the exposed portion 205 of the vacuum tank 210 and connects to the vacuum pump 203 within the vacuum circuit 200. When the line is isolated, the vacuum pump 203 charges the vacuum line with pressure to move fluid in a desired direction of flow within the circuit 205. In an embodiment shown in the FIGS, the vacuum tank 210 may include one or more float capacities that may serve to detect that the level of fluid has reached the maximum capacity of the vacuum tank 210. The capacities may comprise scrubbers or ball floats and valves that rise with the level of the fluid in the vacuum tank 210. When fluids reach the apex 280 of the vacuum tank 210, the vacuum circuit 200 is broken, preventing further fluids from being drawn into the vacuum tank 210. At the apex 280 of the exposed portion 205 of the vacuum tank 210 are a first access hatch 220 and a second access hatch 225. A first float capacity 230 may be located within the vacuum tank 210 the first access hatch 220. A second float capacity may comprise scrubber 270 disposed between the air line 260 and the vacuum pump 203, the scrubber 270 having the ability to serve as a secondary or float back-up to the first float capacity 230. Vacuum tank 210 may also comprise a drain 290 that may be removed to access the vacuum tank 210 at its base for removal of solids and for other functionalities as may be understood within the scope of this invention.

FIG also discloses a vacuum circuit valve 180 that may divert the flow from the vacuum circuit 200 to the screen, then to another towards the main return line 450 and centrifuge system 470 for the removal of smaller particulates, to the mixing tank or discharged back to the client for use.

Though the combination unit 10 contains other ports and pumps that may be utilized to create fluid flow through the system, using the vacuum pump 203 to pull fluids of interest through suction ports 70 offers a direct route traveling to the vacuum tank 210, preferable when pulling heavy fluids into the system or for bypassing the remainder of the matrix system 90 of the combination unit 10. Vacuum tank 210 may also be utilized to prime the matrix system 90 of the combination unit 10 for use in preparation of deploying other pumps. Vacuum circuit 210 may also comprise a muffler 160 that communicates with the air line 260 to provide noise suppression.

A method for importing fluid into the vacuum system and tank is disclosed as follows: A hose of appropriate length is attached to the suction port 70 on the unit and to a fluid source of interest on the other, for example a frac tank containing used drilling fluid full of cuttings and other drilling sediment. The vacuum pump 203 is engaged, charging a pressure within the vacuum line. Fluid enters the suction port 70 from the fluid source of interest, through the three way union 170 and valve selected by the operator to direct the flow towards the vacuum tank 210, the fluid entering at the vacuum port 250 of the vacuum tank 210. From the vacuum port 250, a conduit may extend axially from the back side of the vacuum tank 210 through two valves set on either side of the three way union 170, and then 90 degrees downward to a valve that communicates with vacuum pump 203. After the vacuum tank 210 reaches capacity, the vacuum pump 203 may be reversed in pressure flow, then pulling the fluids from the vacuum port 250 of the vacuum tank 210 through the three way union 170, then directed through the screen 570 before the fluid enters the mixing tank 300, centrifuge system 470 and/or the closed cycle loop of the unit.

According to embodiments shown in the FIGS, the matrix system may connect the mixing tank 300, the vacuum system and tank, the centrifuge, screen and other pumps and access points. The flow may be directed by a series of valves therebetween controlled at a control panel.

Combination unit 10 may also comprise first and second fluid ports 80 located on a first and second side, respectively, of the unit, allowing mating by hoses known for conveying fluid in the industry. Fluid ports 80 may be similar in appearance and function to the suction ports 70 and may be positioned further to the back 40 of the combination unit 10 vis a vis the suction ports 70.

In preferred embodiments as shown in FIGS, a centrifugal pump 150 may be utilized to manage fluid movement throughout the unit via the matrix system 90. For example, the Double Life Corporation Model 250 series pump would be an appropriate pump for a system with a 175 gallon mixing tank 300. The centrifugal pump 150 may propel fluid to a roll line 460 and a pre hopper line according to embodiments of the invention. Further pump or pumps may be utilized, such as a discharge pump that may communicate to the fluid port 80 for additional functionality in the conveyance of treated fluid from the combination unit 10 to a destination of the treated fluid. Discharge pump may operate simultaneously with centrifugal pump, positive pumps, and/or vacuum pump 203 to accomplish unexpected functionalities of the mobile unit. Finally, an external pump may be connected through the fluid ports 80 or the suction ports 70s of the unit to provide movement of fluid through the system.

The unit may comprise a screen to separate large particles and debris from the fluid. The screen may comprise at least one screening mechanism within a trap. In embodiments shown in the FIGS, the screening mechanism comprises a generally flat surface having apertures through which fluid may pass through, the mechanism engaging the inner surfaces of the trap. The screening mechanism may collect large particles and debris harvested in this manner. In preferred embodiments, the screen may be positioned within the main return line 450 so that all fluids entering the centrifugal pump 150 and/or the centrifuge system 470 pass through the screen.

The combination unit 10 may further comprise a centrifuge system 470 for cleaning the fluid of smaller particles in a controlled pressure zone. As the embodiment shown in the FIGS depicts, the centrifuge is positioned at the back 40 of the combination unit 10 on the opposite, atop a stand. The centrifuge system 470 may comprise a positive pressure pump 480, a centrifuge, and an outflow exit. The outflow exit may provide a downward ramp and a collection bin to capture the solids. The positive pump may be programmed at the control panel to pump fluid into the centrifuge at a desired rate to process the fluid through the centrifuge in a minimal amount of cycling, ideally a single cycle.

The unit may further include a venturi hopper to introduce desired elements into the fluids stored in the mixing tank 300, the desired elements including a cleansing element like bentonite clay, dry powdered drilling fluid, polymers, and other additives including those generally referred to as mud mix. Other embodiments known in the industry to add outside elements to fluids may be substituted well within the scope of this invention.

In the embodiment shown in the FIGS, fluid may be directed to a pre-hopper conduit that communicates with a venture hopper located outside the mixing tank 300. As shown in FIGS the pre hopper conduit travels into the back end of the mixing tank 300 and emerges from the front end of the mixing tank 300 to the venture hopper, though pre hopper conduit may travel outside the mixing tank 300 within the scope of the invention.

According to embodiments shown in the FIGS, the venturi hopper may communicate with a post-hopper conduit that terminates within the mixing tank 300. As shown in FIGS, the post hopper conduit rises then turns downwardly towards the bottom 205 of the mixing tank 300. Post hopper conduit may include an open end that propels fluid from a spout at a position closer to the top 303 of the mixing tank 300 than the bottom 205 of the mixing tank 300. Using the venture hopper an operator may control the desired weight of the fluid as it moves it through the unit. If necessary, the operator may introduce other elements to the fluid via the venturi hopper at any point the fluid is circulating or recirculating through the tank. From the control panel, the operator may increase the pressure of the fluid moving through the venture hopper by closing or partially closing the valve leading into the roll line 460.

The mixing tank 300 may be constructed in different shapes and positions thereof, according to preferred embodiments of the invention. The mixing tank 300 may have n-number of sides and shapes, both internally and externally, within the scope of the invention. The mixing tank 300 may comprise an exterior 307 and an interior 310, a first side and a second side, a top portion 303, and a bottom portion 205, a front face oriented towards the front 30 of the combination unit 10 and a back face oriented towards the back 40 of the combination unit 10. In embodiment shown in the FIGs, storage tank has an interior 310 with a rounded base 315 and an exterior 307 structured as a rectangular prism. The mixing tank 300 may be positioned longitudinally along a frame of the combination unit 10 and perpendicular to the wheel axles. The mixing tank 300 as shown has a volume of approximately 175 barrels. Another embodiment having proportional dimensions as those depicted may comprise 300 barrels. Other ranges of volumes between 50 and 5000 barrels possible within the scope of the invention to address fluid management for projects of various scale.

The mixing tank 300 may churn the fluid emerging from the venture hopper in a manner that mixes and shears fluids with additives to a conditioned and ready state of use.

Mixing tank 300 may mix, shear and condition fluid having unmixed additives by directing pressurized flows of fluid and by deploying novel mixing apparatuses into the mixing tank 300.

The mixing tank 300 may comprise a first mixing conduit 365 along a first side of the mixing tank 300 and a second mixing conduit 405 along a second side of the mixing tank 300. In one embodiment, the mixing conduits may have a series of jets along a base of the mixing conduit, the each jet oriented downwardly towards the rounded base 315 of the mixing tank 300. In another embodiment, a series of dispensers may emerge from the mixing conduits, each dispenser comprising a jet. In an embodiment of the invention shown in FIGS, the mixing conduits may be built into sidewalls of the rounded base 315 so that the conduits represent an apex of the rounded base 315. In other embodiments of the invention, the mixing conduits may be positioned outside of the interior 310 of the mixing tank 300 and piped into the mixing tank 300 for dispersal of the fluids through the dispensers.

Dispensers 415 may resemble an elbow joint communicating with the mixing tank 300, having a 90 degree bend downward. Dispensers 415 may have a profile extending from an initial diameter to a diameter smaller than the initial diameter, the fluid exiting from the smaller diameter of the dispensers 415. First and second mixing conduits may have dispensers 415 positioned in a symmetrical, opposing fashion so that the fluid flow of the first mixing conduit 365 dispenser meets the flow of the fluid exiting the second mixing conduit 405 dispense about the center 317 of the rounded base 315. In embodiments shown in FIGS, dispensers 415 of first mixing conduit 365 are staggered from the dispensers 415 of the second mixing conduit 405, each dispenser directing a stream of fluid flow along a path across the full rounded base 315 of the mixing tank 300. FIG shows fluid propelling from the first mixing conduit 365 may travel a first series of paths along the rounded base 315 across the center 317 and climbing a side of the rounded base 315 opposite of the first mixing conduit 365. Directed fluids propelled from the dispensers 415 of the first mixing conduit 365 may travel a first series of paths up an opposite end of the rounded base 315 and then in an upwards direction. Directed fluids propelled from the dispensers 415 of the second mixing conduit 405 may travel a second series of paths and then in an upwards direction. In the embodiment shown in FIG, the first series of paths are thus incongruent with the second series of paths along the rounded base 315 of the mixing tank 300.

The mixing tank 300 may include a mixing apparatus having a rotary axis turned by a motor or other powering device disposed at the top 303 the mixing tank 300. The rotary axis may be oriented vertically and downward into the mixing tank 300. The rotary axis may include sets of fluid engaging elements projecting from the axis. Each set of fluid engaging elements may be held at a distance from the rotary axis by a radial element. Radial elements may be flat discs as depicted in FIGS, or other shapes within the scope of the invention. As seen in FIGS, fluid engaging elements resemble flat rectangular shapes having a leading edge and a trailing edge, the leading edge being lower and forward of the trailing edge to urge fluids in an upwards, circulating fasion to the set of fluid engaging elements positioned higher along the rotating axis. Fluid engaging elements may have apertures according to other embodiments in the invention. Other shapes and configurations of fluid engaging elements are well within the scope of the invention having n-number of sides, convex or concave attributes.

As described infra, directed fluids from the mixing conduits may travel across the rounded base 315 of the mixing tank 300 to an opposite side and project upwards. The fluid engagement elements of the mixing apparatuses may engage and "pick up" the directed fluids projected upwardly as shown in FIG.

The rounded base 315 of the mixing tank 300 may comprise a main return line 450 that may be located at the center 317 of rounded base 315. The main return line 450 may have a series of drains through which drained fluid enters, by way of gravity and/or by pressurizing the main return line 450 to pull fluids into the conduit. As seen in FIGS, drains are located on the lower sides of the main return line 450, the conduit located vertically contiguous or nearly so to the center 317 of the rounded base 315. The main return line 450 may then communicate the fluid back to the main return line 450, capable of selectively returning the drained fluid back through the centripetal pump and the return conduit the mixing conduit, or discharged from the unit altogether. The fluid return conduit may be positioned along an axial orientation near or at the base within the mixing tank 300 or below the rounded base 315 of the mixing tank 300. In another embodiment of the invention, the center 317 of the rounded base 315 comprises a series of drains that empty directly into the main return line 450.

As seen in FIGS, main return line 450 may transition through a centrifugal pump 150 directly or indirectly to a roll line 460. In this embodiment, during mixing operations the main return line 450 flows to the back 40 of the combination unit 10 and the roll line 460 flows towards the front 30 of the combination unit 10, or in opposite directions. At a back face of the mixing tank 300, roll line 460 may split into the first mixing conduit 365 and the second mixing conduits before entering the mixing or inside the interior 310 of the mixing tank 300.

As seen in FIGS, the back face of the mixing tank 300 may be positioned co-axially with the vacuum tank 210. Vacuum tank 210 may be partially set within the mixing tank 300, exposing the back face of the vacuum tank 210 and other elements of the vacuum circuit 200. Bottom portion 205 of a back face of the mixing tank 300 may be exposed below the back face of the vacuum tank 210, allowing ingress of the pre hopper conduit, the roll line 460/mixing conduits directly into the mixing tank 300. In an embodiment of the invention, a combination tank comprising of the vacuum tank 210 and the mixing tank 300 have no means of communication within the tank. In this embodiment, the mixing conduits, post-hopper lines, main return line 450 and volume within the mixing tank 300 does not have a path to the vacuum tank 210 within the combination tank. The synergy of partially enclosing the vacuum tank 210 inside a co-axially aligned mixing tank 300 has many benefits. The inventive combination unit 10 may scale up the volumes of tanks to the ranges disclosed herein while navigating the unimproved, oft-times windy roads where energy development may occur. If the combination unit 10 travels with fluid, splitting the volume into both vacuum tank 210 and mixing tank 300 adds driving stability without raising the altitude of the combination unit 10 to heights that impinge upon power lines and drilling rig support cables. Positioning the two faces of the vacuum tank and mixing tank 300 in a contiguous manner presents a number of advantages and unexpected benefits, including the availability of a small volume, closed loop system and/or creating a jet cleaning system using portions of the vacuum circuit 200 and lines feeding the mixing tank 300.

According to embodiments shown in the FIGS, an electronic control panel may control the use of the described components in the combination unit 10. The control panel may have a digital means to program other operational details as needed for each project, such as customizing both the rate flow for the positive pressure pump 480 and the spin rate of the centrifuge, initiating or terminating the vacuum pump 203, the discharge pump, the centrifugal pump 150, and/or the motors powering the mixing apparatuses of the mixing tank 300. Control panel may be located between the centrifugal system and the vacuum pump 203 giving the operator a line of sight to both the centrifugal pump and vacuum pump 203 located on the combination unit 10.

Operation of the combination unit 10 may comprise a number of methods within the scope of the invention, depending on the characteristics of the fluids of interest and the objective of the project itself. The combination unit 10 may be utilized in number of applications to capture fluids, to clean and condition the fluids on location, to move fluids from one container to another, and build desired drilling weight of the mud. The unit may clean fluids from frac tanks, on location mud pits, and production tank batteries. It may be used to control spills at drilling sites and production sites.

In oil and gas drilling operations, fluids are utilized in operations to drill boreholes in the earth. Fluids are typically collected in a mud pit or frac tank, or a collection site, for further processing to remove particulates, debris, and to condition the fluid for further use in the drilling operation. An operator will attach a hose to a suction port 70 of fluid port 80 of the unit and then engage the vacuum pump 203 or centripetal pump to collect the fluid from the collection site and direct the flow into the vacuum tank 210, mixing tank 300 or closed loop as needed. The fluid may travel through screening mechanism to collect large particulates and then directed through the centrifuge system 470 for micro-cleaning. The cleaned fluid is then pushed forward to the venture hopper, where additives are added to the fluid. The fluid with additives enters the mixing tank 300 and undergoes an intensive mixing process to shear the fluid and additives until the fluid is considered homogenized with the additives, conditioned and ready for use for the drilling operations desired. The fluid is then discharged from the fluid port 80 and hose to a location as desired by the drilling rig operator.

The unit may comprise a closed loop system for cleaning small volumes of fluid at time, while leaving the drilling operators the ability to continue drilling operations without down time, even in large storage pits holding 1000 barrels of used drilling fluid. By closing the valves on the roll line 460 and the main return line 450, the combination unit 10 may use the vacuum pump 203 to prime the remaining lines to pull in and clean a small amount of dirty fluids at a time. The closed loop system may maintain a constant flow of fluid into the suction port 70, through the screen, the centripetal pump, the positive pressure pump 480, the centrifuge, the back to the fluid port 80 for discharge of cleaned fluid. For example, invention as depicted in FIG may treat 3-7 barrels of fluid at a time, though greater ranges are possible within the scope of the invention.

The combination unit 10 may be utilized to clean out a frac tank having only solids remaining. In this scenario, the fluids have typically been removed for use or transported away from the site, leaving only residue of varying state of solids content or sludge. Typically, this sludge is considered waste that has a negative cost of disposal. The typical process requires additional water to clean the sludge from the frac tank, a winch truck or other lifting means to raise the frac tank on one end. The combination unit 10 may be utilized to clean and recycle fluid in the following manner without the use of any external water. 1) Connect the suction port 70 of the combination unit 10 to the clean out drain of the frac tank, 2) Attach a hose to the fluid port 80 of the combination unit 10 and spray gun to the end of the hose 3) Engage the vacuum pump 203 to prime the lines of the of the combination unit 10 (roll line 460s, main return, vacuum circuit 200, et al) and vacuum the sludge into the vacuum tank 210, 4) engage the centrifugal pump 150 and open the valve isolating the vacuum circuit 200 from the main return line 450, 5) direct fluid through the centrifuge system 470 of the combination unit 10 and clean fluid of solids, 6) direct clean fluid back to the main return line 450 and to the fluid port 80, 6) Engage the discharge pump at the fluid port 80 and utilize the spray gun to direct the clean fluid into the frac tank, dislodging sludge and caked solids, 7) Continue to vacuum the mix of solids and clean fluid from the spray gun from the frac tank, 8) Repeat cycle of separating the solids in centrifuge and using the clean fluids to wash out the frac tank until the frac tank is clean and clean fluid is directed to storage site as desired.

When and oil or gas (or combination thereof) well begins production, there are numerous scenarios in which the combination unit 10 offers a practical solution to everyday challenges. Consider, by way of example and not limitation, the scenario of a production fluid leak.

Whether at the well head site or along a pipeline, oil spills prove difficult to clean even when optimal conditions are presented: easy access to the spill site, readily available equipment, close access to facilities for processing the cleaned debris, etc. When leaks occur in remote areas, the response time can greatly influence impact of a spill and consequentially, the risk to environment and financial impact to clean the spill.

The combination unit 10 offers an inventive ability to process different fluids and solids that are either spilled or directly impacted by an oil spill. The unit may deliver such services regardless of wherever a spill occurs.

First, an operator may use the vacuum pump 203 and hose to vacuum fluids and impacted earth, biological matter, rocks, or collected matter from an impacted spill site. The collected matter may be pumped into the tank to begin separation of the large particulates from the liquids. Additionally, fluids may be further separated by circulating inside the vessel pumped through centrifuge out into a vacuum tank 210.

Other embodiments of the current invention will be apparent to those skilled in the arts from a consideration of this specification or practice of the invention disclosed herein. Thus, the foregoing specification is considered merely exemplary of the current invention with the true scope thereof being defined by the following claims.

What is claimed is:

1. A mobile, combination unit for the intake, storage, cleaning, and conditioning of fluids used in energy drilling and production worksites, the unit having a front and back portion, and a first side and second side, the unit comprising:
   a first suction port and a second suction port located on a first side and second side of the unit for intake or discharge of a fluid of interest,
   a first fluid port and a second fluid port located on a first side and a second side of the unit for intake or discharge of a fluid of interest, the first and second fluid port communicating with a discharge pump capable of creating line pressure at the first fluid port and the second fluid port, a vacuum circuit comprising a vacuum pump and vacuum conduit, and a vacuum tank comprising
  a volume capacity,
  an access hatch atop the vacuum tank,
  a vacuum port, the vacuum port communicating with the first and second suction port through pressure generated by the vacuum pump within the vacuum circuit,
  an air line positioned between the top of the vacuum tank and the vacuum pump,
  a float valve located between the air line and the vacuum tank and a float residing within and rising with the fluid inside the vacuum tank, wherein upon reaching the volume capacity of the vacuum tank the float engages the float valve and cuts off the air line pressure,
a mixing tank having an exterior and an interior, a first side and a second side, a top portion, and a bottom portion, and at its interior bottom portion a rounded base, the mixing tank further comprising
  a first mixing conduit and a second mixing conduit disposed along the interior walls of the mixing tank, the first mixing conduit located on the first side and the second mixing conduit located on the second side,
  a main return line partially disposed within the mixing tank, the main return line having apertures through which fluid may travel within the mixing tank, the main return having a screen, the screen also communicating with the vacuum line,
  a mixing apparatus disposed from the top and into the interior of the mixing tank, the mixing apparatus having an rotating axis supporting a fluid engagement element positioned diagonally and having a leading edge and a trailing edge, the leading edge of the fluid engagement element being lower than the trailing edge,
a centrifuge system, comprising a centrifuge and a positive pressure pump capable of programming the rate of flow of the fluid to be processed by the centrifuge,
a matrix system for moving the fluids through the unit,
a centrifugal pump disposed between the main return line and a roll line that communicates with the first mixing conduit and the second mixing conduit,
a venturi hopper,
a post-hopper conduit located between the hopper and mixing tank,
a screen for capturing and removing large particulates of the fluids,
a control panel electronically linked to and controlling the mixing apparatuses, the centrifugal pump, the positive pressure pump, the vacuum pump and the discharge pump.

2. In the combination unit of claim 1, the first mixing conduit having a series of dispensers and a second mixing conduit having a series of dispensers disposed along the interior walls of the mixing tank, the first mixing conduit located above the rounded base of the first side and the second mixing conduit above the rounded base along the second side, the dispensers of the first mixing tank and second mixing tank propelling directed fluids down the sidewalls of the rounded base, staggered in position from the dispensers of the second mixing conduit, whereby the directed fluids leaving the dispensers of the first mixing conduit travel a first series of paths upwards an opposite end of the rounded base, the directed fluids propelled from the dispensers of the second mixing conduit and traveling a second series of paths upwards an opposite end of the rounded base, and whereby first series of paths are incongruous with the second series of paths along the rounded base of the mixing tank and whereby the fluid engagement elements of the mixing apparatuses may pick up the directed fluids as they travel upwards.

3. In the combination unit from claim 1, the matrix system further comprising a closed loop system of between 3-7 barrels in volume that may be isolated within the matrix system by closing a roll line valve located upstream of the mixing conduits and pre hopper line, and by closing a main valve located on the main return between the fluid removal conduit and the screen.

4. In the combination unit from claim 1, the post hopper conduit traveling from the exterior to the interior at the first side of the mixing tank and carrying fluids embedded with drilling fluid additives, the post-hopper conduit further comprising an initial altitude, a second altitude higher than the initial altitude, and a spout from which pressurized fluids propel from the post-hopper conduit downwardly within the interior of the mixing tank.

* * * * *